(12) United States Patent
Evans et al.

(10) Patent No.: US 10,949,328 B2
(45) Date of Patent: Mar. 16, 2021

(54) DATA FLOW GRAPH COMPUTATION USING EXCEPTIONS

(71) Applicant: Wave Computing, Inc., Campbell, CA (US)

(72) Inventors: Keith Mark Evans, San Jose, CA (US); Stephen Curtis Johnson, Morgan Hill, CA (US)

(73) Assignee: Wave Computing, Inc., Santa Clara, CA (US)

( * ) Notice: Subject to any disclaimer, the term of this patent is extended or adjusted under 35 U.S.C. 154(b) by 0 days.

(21) Appl. No.: 16/502,110

(22) Filed: Jul. 3, 2019

(65) Prior Publication Data

US 2019/0324888 A1    Oct. 24, 2019

Related U.S. Application Data

(63) Continuation-in-part of application No. 16/104,586, filed on Aug. 17, 2018.
(Continued)

(51) Int. Cl.
*G06F 15/82* (2006.01)
*G06F 11/36* (2006.01)
(Continued)

(52) U.S. Cl.
CPC .......... *G06F 11/3612* (2013.01); *G06F 8/433* (2013.01); *G06F 11/0709* (2013.01); *G06F 11/0721* (2013.01); *G06F 15/7871* (2013.01)

(58) Field of Classification Search
None
See application file for complete search history.

(56) References Cited

U.S. PATENT DOCUMENTS 5,142,631 A    8/1992  Murray et al.
5,247,671 A    9/1993  Adkins et al.
(Continued)

FOREIGN PATENT DOCUMENTS

JP    2005165961 A    12/2003
WO   WO2009131569 A1   10/2009

OTHER PUBLICATIONS

Gupta, S., Agrawal, A., Gopalakrishnan, K., & Narayanan, P. (Jun. 2015). Deep learning with limited numerical precision. In International Conference on Machine Learning (pp. 1737-1746).
(Continued)

*Primary Examiner* — Cheng Yuan Tseng
(74) *Attorney, Agent, or Firm* — Adams Intellex, PLC

(57) ABSTRACT

Techniques are disclosed for data manipulation within a reconfigurable computing environment for data flow graph computation using exceptions. Processing elements are configured within a reconfigurable fabric to implement a data flow graph. The processing elements are loaded with process agents. Valid data is executed by a first process agent on a first processing element, where the first process agent corresponds to a starting node of the data flow graph. A second processing element detects that an error exception has occurred, where a second process agent is running on the second processing element. A done signal to a third process agent is withheld by the second process agent, where the third process agent is running on a third processing element. The second process agent raises an interrupt request, where the interrupt request is based on the detecting that an error exception has occurred.

22 Claims, 11 Drawing Sheets

Related U.S. Application Data

(60) Provisional application No. 62/856,490, filed on Jun. 3, 2019, provisional application No. 62/850,059, filed on May 20, 2019, provisional application No. 62/827,333, filed on Apr. 1, 2019, provisional application No. 62/802,307, filed on Feb. 7, 2019, provisional application No. 62/800,432, filed on Feb. 2, 2019, provisional application No. 62/773,486, filed on Nov. 30, 2018, provisional application No. 62/694,984, filed on Jul. 7, 2018, provisional application No. 62/692,993, filed on Jul. 2, 2018, provisional application No. 62/679,046, filed on Jun. 1, 2018, provisional application No. 62/679,172, filed on Jun. 1, 2018, provisional application No. 62/650,425, filed on Mar. 30, 2018, provisional application No. 62/650,758, filed on Mar. 30, 2018, provisional application No. 62/637,614, filed on Mar. 2, 2018, provisional application No. 62/636,309, filed on Feb. 28, 2018, provisional application No. 62/611,600, filed on Dec. 29, 2017, provisional application No. 62/611,588, filed on Dec. 29, 2017, provisional application No. 62/594,563, filed on Dec. 5, 2017, provisional application No. 62/594,582, filed on Dec. 5, 2017, provisional application No. 62/579,616, filed on Oct. 31, 2017, provisional application No. 62/577,902, filed on Oct. 27, 2017, provisional application No. 62/547,769, filed on Aug. 19, 2017, provisional application No. 62/857,925, filed on Jun. 6, 2019.

(51) Int. Cl.
  *G06F 11/07* (2006.01)
  *G06F 8/41* (2018.01)
  *G06F 15/78* (2006.01)

(56) References Cited

U.S. PATENT DOCUMENTS

| | | | |
|---|---|---|---|
| 6,134,605 A | 10/2000 | Hudson et al. | |
| 6,363,470 B1 | 3/2002 | Laurenti et al. | |
| 7,817,655 B1 | 10/2010 | Bennett et al. | |
| 8,234,613 B2 * | 7/2012 | Tabaru | G06F 30/34 716/121 |
| 8,314,636 B2 | 11/2012 | Hutton et al. | |
| 8,341,469 B2 | 12/2012 | Miyama et al. | |
| 8,493,974 B1 | 7/2013 | Nelson et al. | |
| 9,092,305 B1 | 7/2015 | Blott et al. | |
| 10,402,527 B2 * | 9/2019 | Boesch | G06N 3/0454 |
| 10,467,183 B2 * | 11/2019 | Fleming, Jr. | G06F 15/80 |
| 2002/0167337 A1 | 11/2002 | Chelcea et al. | |
| 2002/0184241 A1 | 12/2002 | Wu | |
| 2003/0061240 A1 | 3/2003 | McCann et al. | |
| 2004/0120189 A1 | 6/2004 | Schauer | |
| 2006/0206635 A1 | 9/2006 | Alexander et al. | |
| 2007/0133399 A1 | 6/2007 | Gangwal | |
| 2008/0168303 A1 | 7/2008 | Spear et al. | |
| 2008/0250225 A1 | 10/2008 | Chester | |
| 2009/0070552 A1 | 3/2009 | Kanstein et al. | |
| 2009/0089605 A1 | 4/2009 | Westwick et al. | |
| 2010/0013517 A1 | 1/2010 | Manohar et al. | |
| 2010/0017774 A1 | 1/2010 | Bachina et al. | |
| 2010/0115322 A1 | 5/2010 | Petrick | |
| 2010/0281448 A1 | 11/2010 | He | |
| 2010/0332755 A1 | 12/2010 | Bu et al. | |
| 2011/0167189 A1 | 7/2011 | Matsubara et al. | |
| 2011/0199117 A1 | 8/2011 | Hutchings et al. | |
| 2012/0119781 A1 | 5/2012 | Manohar et al. | |
| 2012/0235839 A1 | 9/2012 | Mazumdar et al. | |
| 2012/0290810 A1 | 11/2012 | Lecler et al. | |
| 2012/0319730 A1 | 12/2012 | Fitton et al. | |
| 2013/0009666 A1 | 1/2013 | Hutton et al. | |
| 2013/0009667 A1 | 1/2013 | Calhoun et al. | |
| 2013/0043902 A1 | 2/2013 | Rahim et al. | |
| 2014/0075144 A1 | 3/2014 | Sanders et al. | |
| 2015/0123707 A1 | 5/2015 | Nicol | |
| 2015/0268963 A1 | 9/2015 | Etsion et al. | |
| 2015/0317252 A1 | 11/2015 | Kannan | |
| 2016/0139807 A1 | 5/2016 | Lesartre et al. | |
| 2017/0032285 A1 | 2/2017 | Sharma et al. | |
| 2017/0061279 A1 | 3/2017 | Yang et al. | |
| 2017/0140263 A1 | 5/2017 | Kaiser et al. | |

OTHER PUBLICATIONS

International Search Report dated Feb. 6, 2015 for PCT/US2014/063591.
Courbariaux, M., Bengio, Y., & David, J. P. (2014). Training deep neural networks with low precision multiplications. arXiv preprint arXiv:1412.7024.
Ioffe, S., & Szegedy, C. (2015). Batch normalization: Accelerating deep network training by reducing internal covariate shift. arXiv preprint arXiv:1502.03167.
Gupta, S., Agrawal, A., Gopalakrishnan, K., & Narayanan, R (Jun. 2015). Deep learning with limited numerical precision. In International Conference on Machine Learning (pp. 1737-1746).
Lai, L., Suda, N., & Chandra, V. (2017). Deep convolutional neural network inference with floating-point weights and fixed-point activations. arXiv preprint arXiv:1703.03073.

* cited by examiner

DATA FLOW GRAPH COMPUTATION USING EXCEPTIONS

RELATED APPLICATIONS

This application claims the benefit of U.S. provisional patent applications "Data Flow Graph Computation Using Exceptions" Ser. No. 62/694,984, filed Jul. 7, 2018, "Reconfigurable Fabric Configuration Using Spatial and Temporal Routing" Ser. No. 62/773,486, filed Nov. 30, 2018, "Machine Learning for Voice Calls Using a Neural Network on a Reconfigurable Fabric" Ser. No. 62/800,432, filed Feb. 2, 2019, "FIFO Filling Logic for Tensor Calculation" Ser. No. 62/802,307, filed Feb. 7, 2019, "Matrix Multiplication Engine Using Pipelining" Ser. No. 62/827,333, filed Apr. 1, 2019. "Dispatch Engine with Queuing and Scheduling" Ser. No. 62/850,059, filed May 20, 2019, "Artificial Intelligence Processing Using Reconfiguration and Tensors" Ser. No. 62/856,490, filed Jun. 3, 2019, and "Dispatch Engine with Interrupt Processing" Ser. No. 62/857,925, filed Jun. 6, 2019.

This application is also a continuation-in-part of "Reconfigurable Fabric Data Routing" Ser. No. 16/104,586, filed Aug. 17, 2018, which claims the benefit of U.S. provisional patent applications "Reconfigurable Fabric Data Routing" Ser. No. 62/547,769, filed Aug. 19, 2017, "Tensor Manipulation Within a Neural Network" Ser. No. 62/577,902, filed Oct. 27, 2017, "Tensor Radix Point Calculation in a Neural Network" Ser. No. 62/579,616, filed Oct. 31, 2017, "Pipelined Tensor Manipulation Within a Reconfigurable Fabric" Ser. No. 62/594,563, filed Dec. 5, 2017, "Tensor Manipulation Within a Reconfigurable Fabric Using Pointers" Ser. No. 62/594,582, filed Dec. 5, 2017, "Dynamic Reconfiguration With Partially Resident Agents" Ser. No. 62/611,588, filed Dec. 29, 2017, "Multithreaded Dataflow Processing Within a Reconfigurable Fabric" Ser. No. 62/611,600, filed Dec. 29, 2017, "Matrix Computation Within a Reconfigurable Processor Fabric" Ser. No. 62/636,309, filed Feb. 28, 2018, "Dynamic Reconfiguration Using Data Transfer Control" Ser. No. 62/637,614, filed Mar. 2, 2018, "Data Flow Graph Computation for Machine Learning" Ser. No. 62/650,758, filed Mar. 30, 2018, "Checkpointing Data Flow Graph Computation for Machine Learning" Ser. No. 62/650,425, filed Mar. 30, 2018, "Data Flow Graph Node Update for Machine Learning" Ser. No. 62/679,046, filed Jun. 1, 2018, "Dataflow Graph Node Parallel Update for Machine Learning" Ser. No. 62/679,172, filed Jun. 1, 2018, "Neural Network Output Layer for Machine Learning" Ser. No. 62/692,993, filed Jul. 2, 2018, and "Data Flow Graph Computation Using Exceptions" Ser. No. 62/694,984, filed Jul. 7, 2018.

Each of the foregoing applications is hereby incorporated by reference in its entirety.

FIELD OF ART

This application relates generally to data manipulation and more particularly to data flow graph computation using exceptions.

BACKGROUND

Researchers, businesspeople, and governments collect and analyze vast amounts of data. The data is most typically collected from people as they interact with their personal and other electronic devices. The interactions can be online, in public, or at home. The collection of public, personal, and other data has become so commonplace that the collection frequently goes unnoticed until there is a problem. An individual may be using her smartphone to research world events, while another person is using his tablet to order pet food or toner cartridges. Data is collected and analyzed for purposes of monetization, security, or surveillance, among others. Analysis results are used to push online content, products, or services that are predicted to match user interests.

Emerging software analysis techniques and processor architectures are propelling the collection of personal and other data at an accelerating rate. Businesspeople, researchers, and governments aggregate the collected data into datasets that are often referred to as "big data". The big data datasets can then be analyzed. The sizes of the big data datasets overwhelm the capabilities of the traditional processors and analysis techniques, making the analysis economically infeasible. Other data handling requirements, such as the access, capture, maintenance, storage, transmission, and visualization of the data, among other tasks, further complicate the computational and processing requirements. Any one of these data handling requirements can quickly saturate or exceed the capacities of the traditional systems. The collected data would be of little or no fundamental value without viable and scalable data analysis and handling techniques. Innovative computing architectures, as well as software techniques, algorithms, functions, routines, and heuristics, are necessitated. Dataset stakeholders are motivated by business, research, and other interests to analyze the data. Common data analysis purposes include business analysis; disease or infection detection, tracking, and control; crime detection and prevention; meteorology; and complex scientific and engineering simulations; among many others. Advanced data analysis techniques are finding applications such as predictive analytics, which can be used to show consumers what they want, even before the consumers know that they want it. Further approaches include applying machine learning and deep learning techniques in support of the data analysis.

Advanced processing hardware has been introduced, as have software learning techniques, which have been a boon to many computer science disciplines including machine learning. Machine learning posits that a machine on its own can "learn" about a unique dataset. The machine learning occurs without requiring that the machine be explicitly coded or programmed by a user to handle that dataset. Machine learning can be performed on a network of processors such as a neural network. The neural network can process the big data datasets so that the neural network can learn about the data contained within the dataset. The greater the quantity of data, and the higher the quality of the data that is processed, the better the outcome of the machine learning. The processors on which the machine learning techniques can be executed are designed to efficiently handle the flow of data. These processors, which are based on data flow architectures, process data when valid data is presented to the processor. Data flow architectures enable simplifications to a processing system such as avoiding a need for a global system clock.

Computing architectures based on reconfigurable hardware are highly flexible and particularly well suited to processing large data sets, performing complex computations, and executing other computationally resource-intensive applications. Reconfigurable computing integrates the key advantages drawn from hardware and software techniques. A reconfigurable computing architecture can be "recoded" (reprogrammed) to suit a processing need. The recoding adapts or configures the high-performance hardware architecture, much like recoding software. A reconfigurable fabric hardware technique is directly applicable to reconfigurable computing. Reconfigurable fabrics may be arranged in topologies or configurations for the many applications that require high performance computing. Applications such as processing of big data, digital signal processing (DSP), machine learning based on neural networks, matrix or tensor computations, vector operations, Boolean manipulations, and so on, can be implemented within a reconfigurable fabric. The reconfigurable fabric fares particularly well when the data includes specific types of data, large quantities of unstructured data, sample data, training data, and the like. The reconfigurable fabrics can be coded or scheduled to achieve these and other processing techniques, and to represent a variety of efficient computer architectures.

SUMMARY

A data flow graph illustrates the flow of data and the operations performed on the data. The data flow graph includes nodes that represent the logical, mathematical, Boolean, matrix, tensor, or other operations to be performed on data, and arcs that represent the flow of the data between and among the nodes. A data flow graph is an informative visual representation that is particularly well suited to understanding a variety of highly complex computing tasks. The data flow graph represents the data calculations and data flow required to perform those tasks. A data flow graph can be used to represent a variety of networks, including neural networks. The neural networks can be used for machine learning, deep learning, and so on. Machine learning is a technique by which a computing system, such as a reconfigurable fabric, can be configured to "learn". That is, the computing system adapts itself as it processes data to improve inferences, computational performance, convergence, and so on. Machine learning systems can be based on neural networks such as convolutional neural networks (CNNs), deep neural networks, (DNNs), recurrent neural network (RNNs), and so on.

Difficulties arise in performing the operations of a data flow graph when one or more exceptions occur. An exception such as an error exception can occur due to an arithmetic exception, where an arithmetic exception can include a divide by zero exception, an underflow exception, an overflow exception, and so on. An exception can include a signaling error, where a signaling error can include a direct memory access (DMA) abort, a buffer overflow, a buffer underflow, excessive saturation, or an excessive recomputation attempt. When an exception occurs, the source of the exception needs to be determined and proper actions taken. An exception can cause an interrupt request (IRQ) to be raised and a state of a process agent to be stored.

A reconfigurable fabric can be reconfigured by adapting it or "recoding" it to implement a given data flow graph. The data flow graph itself can be adapted by changing code used to configure elements of the reconfigurable fabric. The reconfigurable fabric can include computational or processor elements, storage elements, switching elements for data transfer, control elements, and so on. The reconfigurable fabrics are coded to implement a variety of processing topologies to implement data flow graphs. The reconfigurable fabric can be configured by coding or scheduling the reconfigurable fabric to execute a variety of logical operations such as Boolean operations, matrix operations, tensor operations, mathematical operations, gradient calculations, etc. The scheduling of the reconfigurable fabric can be changed based on a data flow graph Embodiments include a processor-implemented method for data manipulation comprising: configuring a plurality of processing elements to implement a data flow graph; loading the plurality of processing elements with a plurality of process agents; executing valid data by a first process agent on a first processing element from the plurality of processing elements, wherein the first process agent corresponds to a starting node of the data flow graph; detecting, by a second processing element from the plurality of processing elements, that an error exception has occurred, wherein a second process agent is running on the second processing element; and withholding a done signal, by the second process agent, to a third process agent, wherein the third process agent is running on a third processing element from the plurality of processing elements. Some embodiments comprise raising, by the second process agent, an interrupt request, wherein the interrupt request is based on the detecting, by a second processing element from the plurality of processing elements, that an error exception has occurred. In embodiments, the execution ceases based on the interrupt request. In embodiments, a state of the second process agent is stored based on the interrupt request. In other embodiments, the third process agent is upstream within the data flow graph from the second process agent. In embodiments, the plurality of processing elements comprises a reconfigurable fabric.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
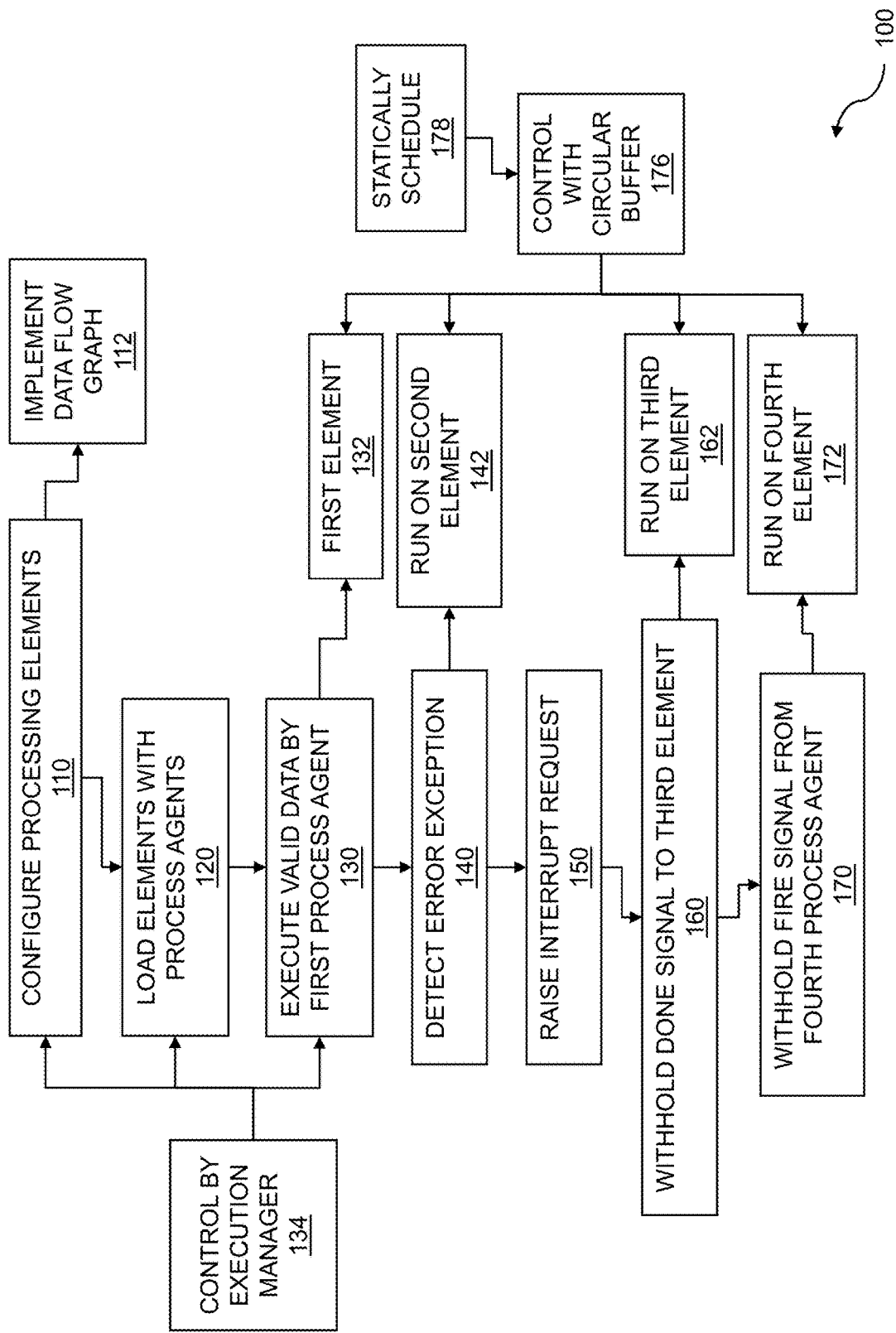
FIG. 1 is a flow diagram for data flow graph computation using exceptions.

Data manipulation can be performed within a reconfigurable computing environment such as a reconfigurable fabric. In a multiple processing or multi-processing element environment, such as a mesh network or other suitable topology, there is an inherent necessity to pass data between or among processing elements. In many instances where multiple processing elements are working together to perform a given task, improvements in parallelism such as parallel execution are desirable, whenever and wherever the parallelism is possible. The improvements in parallelism can directly decrease overall execution time. The more computations that are done in parallel, the greater the reduction in execution time. The reduction in execution time, however, presumes that processing elements are executing valid data and have received signals indicating that execution can proceed.

Techniques are disclosed for data flow graph computation using exceptions. The exceptions can include error exceptions such as arithmetic exceptions and signaling exceptions. The data flow graph computation can be performed on a server, a computing device, a reconfigurable computing device, an integrated circuit or chip, and so on. A reconfigurable computing device can include a reconfigurable fabric. The reconfigurable fabric incorporates critical performance features and coding features of both hardware and software techniques. The hardware techniques include computer architectures specifically designed for high performance computations. The included software techniques enable the hardware to be easily reconfigured for specific computational tasks such as processing data flow graphs, executing neural networks, performing machine learning, and so on. A reconfigurable fabric can include one or more element types, where the element types can include processing elements, storage elements, switching elements, control elements, communication elements, and so on. An element can be configured to perform a variety of architectural and computational operations based on the type of element and by the programming, coding, or "scheduling" of the element. Elements of the reconfigurable fabric can be arranged in quads of elements, where the quads include processing elements, shared storage elements such as first in first out (FIFO) elements or direct memory access (DMA) elements, switching elements, circular buffers for control of the elements, communications paths, registers, and the like. An element or subset of elements within the reconfigurable fabric, such as a quad of elements, can be controlled by providing code or "scheduling" to one or more circular buffers. The code can be executed by enabling—or configuring—the circular buffers to rotate. Code can also be provided to elements within the reconfigurable fabric so that the reconfigurable fabric can perform intended computational tasks such as logical operations including Boolean operations, matrix computations, tensor operations, mathematical operations, machine learning operations, gradient operations, etc. The various elements of the reconfigurable fabric can be controlled by the rotating circular buffers, where the one or more circular buffers can be of the same length or of differing lengths. Agents, functions, routines, algorithms, instructions, codes, etc., can be loaded into a given circular buffer. The rotation of the given circular buffer ensures that the same series of coded steps or instructions is repeated as required by the processing tasks assigned to a processing element of the reconfigurable fabric. The one or more rotating circular buffers can be statically scheduled.

Data flow graph computation uses exceptions. A data flow graph comprises nodes that perform computations and arcs that enable the flow of data between and among the various nodes. A plurality of processing elements is configured to implement a data flow graph. The plurality of processing elements can comprise a reconfigurable fabric. The reconfigurable fabric can include other elements such as storage elements, switching elements, or communications paths. The plurality of processing elements is loaded with a plurality of process agents. The process agents can represent processing nodes of the data flow graph. The process agents can comprise a software construct. The software construct can include processes or functions, as opposed to distinct programs with dedicated processing elements. The software construct can include a data flow language, such as Tensor-Flow or Keras, that is used to describe a data flow graph that is implemented on a neural network. The data flow graph can represent a variety of networks including a neural network. The neural network can implement a learning network such as a machine learning (ML) network, a deep learning (DL) network, etc. The neural network or learning network can be based on a convolutional neural network (CNN), a recurrent neural network (RNN), etc. Valid data is executed by a first process agent on a first processing element from the plurality of processing elements, where the first process agent corresponds to a starting node of the data flow graph. The validity of data can be indicated by the presence of data, a signal, a value, a code, etc. A second processing element from the plurality of processing elements detects that an error exception has occurred, wherein a second process agent is running on the second processing element. An error exception can include an arithmetic exception such as division by zero, an underflow, or an overflow; or a signaling error such as a direct memory access (DMA) abort, a buffer overflow, a buffer underflow, excessive saturation, or an excessive re-computation attempt. The second process agent raises an interrupt request (IRQ), where the interrupt request is based on the detecting, by a second processing element from the plurality of processing elements, that an error exception has occurred. Execution, such as execution of valid data, ceases based on the interrupt request, and a state of the second process agent is stored based on the interrupt request. A done signal is withheld by the second process agent to a third process agent, where the third process agent is running on a third processing element from the plurality of processing elements.

FIG. 1 is a flow diagram for data flow graph computation using exceptions. Agents representing nodes of a data flow graph execute data. When an error exception is detected, signals between or among agents are withheld, and an interrupt request is raised. The flow 100 includes configuring a plurality of processing elements 110 to implement a data flow graph 112. A reconfigurable fabric can include a variety of processing elements. The processing elements within the reconfigurable fabric can include processing elements, switching elements, storage elements, etc. The processing elements can be arranged, such as grouping processing elements in quads. The various processing elements can be controlled by circular buffers. The circular buffers can include instructions, codes, steps, and so on for controlling the processing elements. In embodiments, the circular buffers can be statically scheduled. The reconfigurable fabric can be self-clocked. In embodiments, the reconfigurable fabric is self-clocked on a hum basis. The data flow graph can include nodes and arcs, where the nodes can represent operations on data, and the arcs can represent the flow of data between or among nodes. In embodiments, the data flow graph can include machine learning. Machine learning is a technique by which a computing system, such as a reconfigurable fabric, can be configured to "learn". That is, the computing system is able, as it processes data, to adapt itself to improve inferences, computational performance, and so on. In embodiments, the data flow graph comprises deep learning. Machine learning systems, deep learning systems, and so on, can be based on neural networks. In embodiments, the data flow graph is used to train a neural network. The reconfigurable fabric can be configured for a variety of neural network techniques. In embodiments, the neural network can include a convolutional neural network (CNN). A CNN can include a feed-forward neural network. A CNN can include shift-invariant or space-invariant characteristics and can be based on a shared weights architecture. In other embodiments, the neural network comprises a recurrent neural network (RNN). An RNN can include internode connections that can form a directed graph along a sequence.

The flow 100 includes loading the plurality of processing elements with a plurality of process agents 120. As described throughout, a process agent can include multiple components such as an input component, an output component, a processing component, a signaling component, and so on. The agent can receive input data from a first in first out (FIFO) storage element, a register file, a memory, etc. The agent can send data to an output FIFO, can issue signals such as a fire signal, can receive signals such as a done signal, etc. A process agent can represent a node of the data flow graph. The flow 100 includes executing valid data by a first process agent 130 on a first processing element 132 from the plurality of processing elements. The first process agent corresponds to a starting node of the data flow graph. The data can be valid based on the presence of data, or based on a code, a signal, a value, a key, a header, or the like. The signal can include a fire signal. In embodiments, the configuring, the loading, and the executing can be controlled by an execution manager 134. As described throughout, the execution manager can be part of a host, such as a processor, computer, server, and so on, outside of the reconfigurable fabric. The host can be a LINUX-based host, a UNIX™-based host, a Windows™-based host, a macOS™-based host, and so on.

The flow 100 includes detecting, by a second processing element from the plurality of processing elements, that an error exception has occurred 140, wherein a second process agent is running on the second processing element 142. In embodiments, the first process agent and the second process agent are the same agent. The detecting that an error state has occurred can be based on invalid data or no data, a signal, or another error exception. Various types of error exceptions can occur, and an error exception can originate from any agent. The source of the error exception can be determined. Embodiments include polling the plurality of processing elements to identify the error state. The polling can include sequential polling of processing elements, parallel polling, polling based on quads, and the like. In embodiments, the polling can be accomplished by an execution manager. As will be discussed later, an error exception can include an arithmetic exception, where an arithmetic exception can include a divide by zero exception, an underflow exception, an overflow exception, and so on. An error exception can include a signaling error. In embodiments, the signaling error can include a direct memory access abort, a buffer overflow, a buffer underflow, excessive saturation, or an excessive re-computation attempt.

The flow 100 includes raising, by the second process agent, an interrupt request 150, wherein the interrupt request is based on the detecting, by a second processing element from the plurality of processing elements, that an error exception has occurred. Having detected that an error exception has occurred, various techniques can be used to address the error exception. Addressing of the error exception can include determining the source of the error exception, correcting or recovering from the error exception, and so on. In embodiments, execution, such as execution of valid data by the agents of the data flow graph, ceases based on the interrupt request. In addition to ceasing execution, other techniques can be followed in response to the IRQ. In embodiments, a state of the second process agent can be stored based on the interrupt request. The storing of the state of the process agent can enable later restoration of the state of the process agent. In place of "normal" execution, other codes, instructions, algorithms, heuristics, and so on, can be executed. In embodiments, the other execution can include execution of an interrupt handler. The interrupt handler can determine the cause of the IRQ and can execute actions that should be taken in response to the case of the IRQ. Following actions of the interrupt handler, execution of the data flow graph can be resumed. In order to resume normal execution, a state of the data flow graph prior to the interrupt can be restored. The restoring of the data flow graph state can be based on the previously stored state of the process agent.

The flow 100 includes withholding a done signal, by the second process agent, to a third process agent 160, wherein the third process agent is running on a third processing element 162 from the plurality of processing elements. In embodiments, the third process agent can be upstream within the data flow graph from the second process agent. A done signal can be used to indicate that input data to a process agent such as the third process agent has been extracted from an input FIFO to the third process agent. The done signal may also be used to indicate that execution of valid data has been completed, that output data has been transferred to an output FIFO or buffer, and the like. The withholding the done signal can be based on the raising of the IRQ. The withholding of the done signal can delay or suspend execution of the process agent waiting for the done signal.

The flow 100 includes withholding, by the second process agent, a fire signal from a fourth process agent 170, wherein the fourth process agent is running on a fourth processing element 172 from the plurality of processing elements. In embodiments, the fourth process agent can be downstream within the data flow graph from the second process agent. In embodiments, the circular buffers are statically scheduled. A potential conflict can exist within a data flow graph where agents of the graph could attempt to execute valid data while other agents of the data flow graph could observe an error exception. The withholding of a fire signal can reduce or eliminate the conflict between or among agents within a data flow graph. The conflict may be resolved by the interrupt handler. Execution by the processing elements, configured and loaded with process agents, can be controlled by the fire and done signals. Further, and as discussed elsewhere, the processing elements, such as the first processing element 132, the second processing element 142, the third processing element 162, and the fourth processing element 172, can be controlled by circular buffers 176 and can be statically scheduled 178. The circular buffers can be included within the reconfigurable fabric. The circular buffers can include programs, codes, instructions, etc., that can control the processing elements. The instructions, for example, within the circular buffers can be repeatedly executed. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
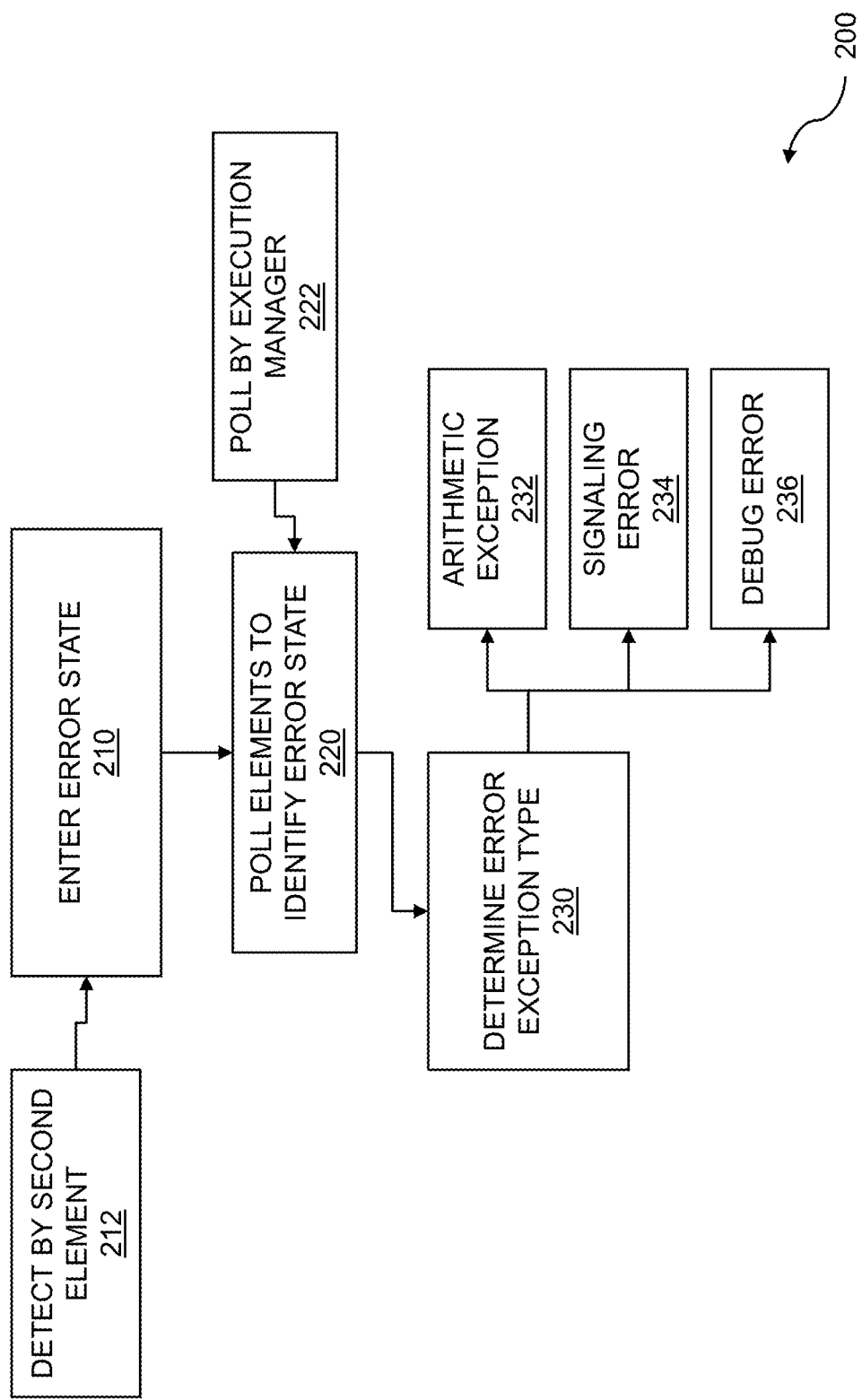
FIG. 2 is a flow diagram error exception determination.

FIG. 2 is a flow diagram for error exception determination. The error exception determination supports data flow graph computation using exceptions. As discussed throughout, processing elements of a reconfigurable fabric are configured to implement a data flow graph. Agents representing nodes of the data flow graph are loaded onto the processing elements, and valid data is executed by a first agent. An error exception is detected by a second agent, and a done signal is withheld from a third agent. The error exception can result from arithmetic exceptions, signal exceptions, and so on.

The flow 200 includes entering, by the second process agent, an error state 210. An error state can be enabled and can include code, algorithms, heuristics, and so on, which can place the second agent into the state. The state can include an error state, an interrupt state, a safe state, a recovery state, and the like. The entering into the error state can be based on detecting, by a processing element from a plurality of processing elements, that an error exception has occurred. In embodiments, a second process agent can be running on a second processing element. In the flow 200, the error state is based on detecting by the second processing element 212. The entering the error state can invoke one or more techniques. Further embodiments include raising, by the second process agent, an interrupt request, where the interrupt request is based on the detecting, by a second processing element, that an error exception has occurred. The interrupt request (IR or IRQ) can be handled by an interrupt handler. In embodiments, execution, such as execution of valid data by an agent representing a node of a data flow graph, can cease based on the interrupt request. The IRQ can invoke further techniques, algorithms, heuristics, etc. In embodiments, a state of the second process agent is stored based on the interrupt request.

The flow 200 includes polling the plurality of processing elements to identify the error state 220. An interrupt request may originate from any agent executing on any processing element. As such, the source of the IRQ and the nature of the IRQ can be determined. Determination of the source and the nature or cause of the IRQ can be based on one or more techniques, codes, algorithms, heuristics, etc. In embodiments, the polling is accomplished by an execution manager 222. The execution manager, which can be based on hardware or software, can be loaded onto configured processing elements of the reconfigurable array. The execution manager can be located beyond the reconfigurable fabric. In embodiments, the execution manager is part of a host outside of the reconfigurable fabric. The host outside of the reconfigurable fabric can include a processor, a co-processor, a local server, a blade server, a remote server, and so on. The host may be controlled by a variety of codes, operating systems (OSs), and so on. In embodiments, the host is a LINUX-based host. The host may be based on other operating systems including, but not limited to UNIX, Windows™, macOS™, and the like. In embodiments, the host can be separately clocked from the reconfigurable fabric.

The flow 200 includes determining an error exception type 230. An error exception can have a variety of causes. The causes can be based on hardware errors, software errors, operating errors, communications errors, and the like. In embodiments, the error exception includes an arithmetic exception 232. Arithmetic exceptions can be based on invalid arithmetic, on numbers which cannot be represented, and so on. In embodiments, the arithmetic exception includes a divide by zero exception. Division by zero is undefined and can result from causes such as missing or invalid data. Other arithmetic operations can cause an arithmetic exception. In embodiments, the arithmetic exception includes an underflow exception. An underflow operation can result from a subtrahend subtracted from a minuend which yields a difference that is too small or too negative to be represented. Similarly, repeated multiplication by a small number can result in underflow. In other embodiments, the arithmetic exception includes an overflow exception. An overflow can result from repeated addition, repeated multiplication or multiplication by large numbers, and so on, resulting in sums or products that cannot be represented. In embodiments, the error exception includes a signaling error 234. A signaling error can result from a superfluous signal, a missing signal, duplicate signals, and so on. The signaling error can result from an agent operation. In embodiments, the signaling error can include a direct memory access abort, a buffer overflow, a buffer underflow, excessive saturation, or an excessive re-computation attempt. In embodiments, the error exception includes a code debugging error 236. The code debugging error can arise during the development phase of an agent, a program, a function, a process, and so on. Rather than have typical operating system hardware and software handle the error, a dataflow-specific recovery method can be implemented. In this way errors can be discovered quickly in the process, and information can be preserved to facilitate efficient debug methods. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
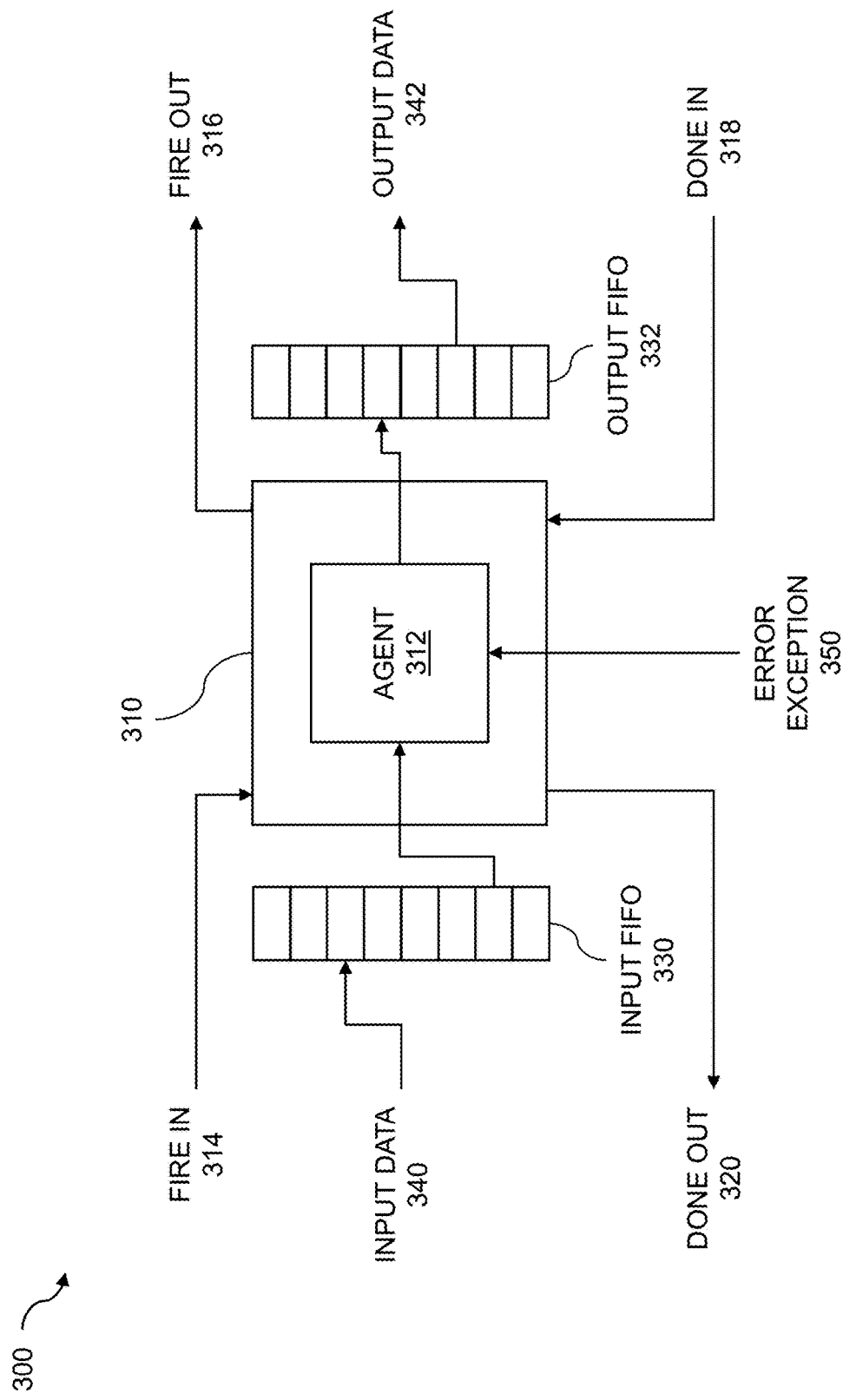
FIG. 3 shows exception operation by an agent.

FIG. 3 shows exception operation by an agent. Exceptions can be used for data flow graph computation. An agent such as a process agent can detect that an error exception has occurred, where the error exception can include an arithmetic error, a signaling error, and so on. The agent can be running on a processing element of a reconfigurable array. An interrupt request (IRQ) can be raised based on an encountered error exception. Execution such as execution of valid data by a process agent can be ceased, and a state-of-the-process agent can be stored. Signals, such as fire signals or done signals that can be communicated between or among agents, can be withheld.

A system or circuit such as one shown in 300 can include a processing element 310. The processing element can be one of a plurality of processing elements. The processing elements can be within a reconfigurable fabric. The processing elements can be one or more single- or multi-core computers. The processing elements can be configured to implement a data flow graph, where the data flow graph can represent a network such as a neural network. The data flow graph can represent a machine learning network, a deep learning network, and the like. An agent such as agent 312 can be loaded onto the processing element 310. Various signals can be coupled to the agent, where the signals can include input signals, output signals, control signals, etc. The signals can control the operation of the agent. The signals can include fire in 314, fire out 316, done in 318, done out 320, and the like. The agent can receive data or produce data. The agent can receive multiple data inputs and can produce multiple data outputs. The agent 312 can be in communication with an input FIFO 330, and an output FIFO 332. The input FIFO can receive input data 340. The output FIFO can send output data 342.

The agent 312 can detect that an error exception 350 has occurred. An error exception can be based on a computational error, a signaling error, and so on. In embodiments, the error exception includes an arithmetic exception. An arithmetic exception can include an invalid or illegal operation. In embodiments, the arithmetic exception can include a divide by zero exception. Other arithmetic exceptions can include an underflow exception or an overflow exception. An underflow exception can include a value that may be too small or too negative to be represented by a number system used by the agent. An underflow exception can include a "wrap" error, where a large negative number wraps to become a positive number. An overflow exception can include a value too large to be represented by the number system used by the agent, a wrap error where a large positive number becomes a negative number, etc. In embodiments, a signaling error includes a direct memory access abort, a buffer overflow, a buffer underflow, excessive saturation, or an excessive re-computation attempt.

Figure 4:
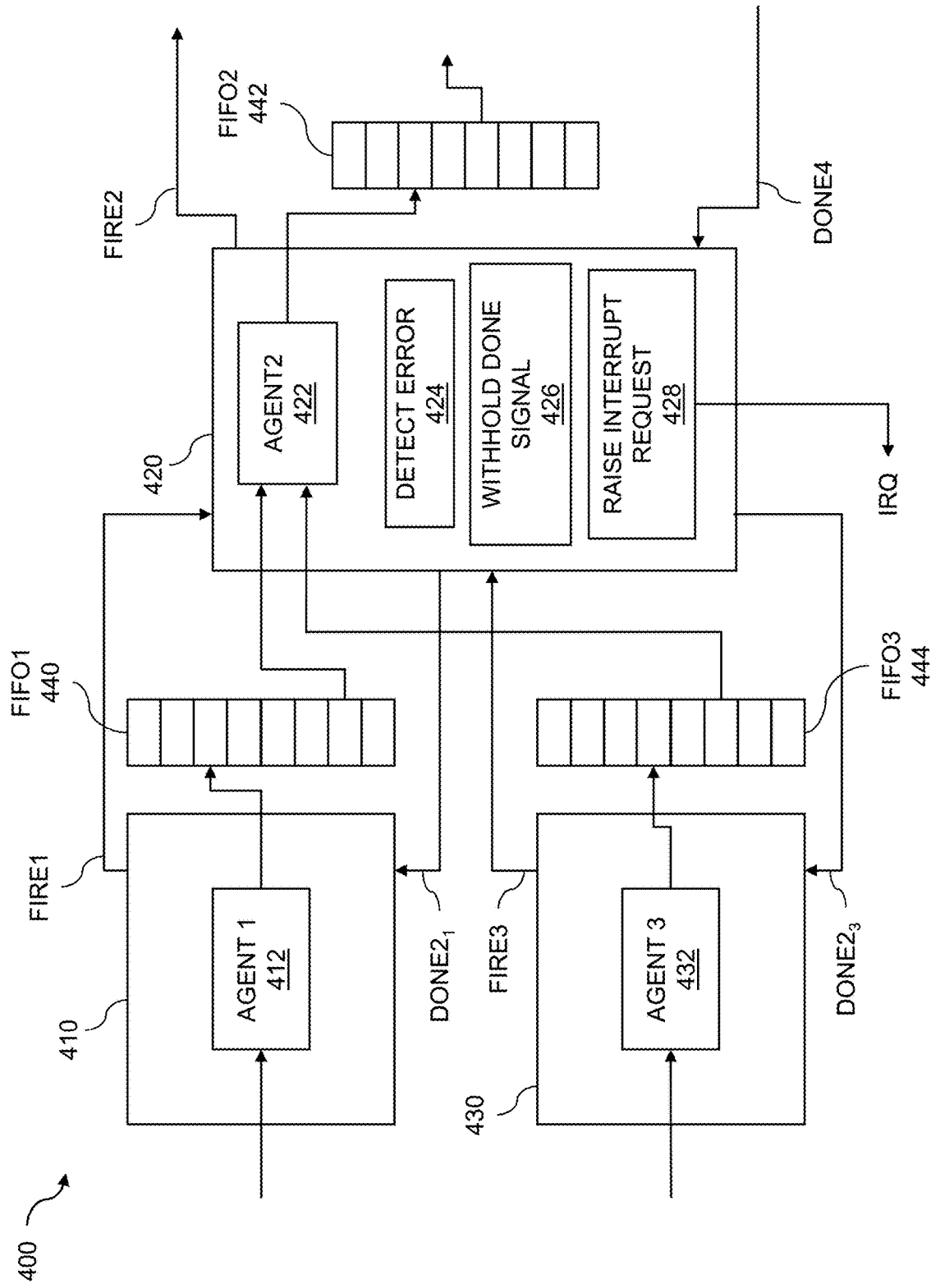
FIG. 4 illustrates error exception detection and interrupt request raising.

FIG. 4 illustrates error exception detection and interrupt request raising. Data flow graph computation uses exceptions. A plurality of processing elements is configured to implement a data flow graph. The data flow graph can represent a network such as a machine learning or a deep learning network. The plurality of processing elements is loaded with a plurality of process agents. Valid data is executed by a first process agent on a first processing element, where the first process agent corresponds to a starting node of the data flow graph. A second processing element detects that an error exception has occurred, where a second process agent is running on the second processing element. The error exception that can be detected can include an arithmetic exception or signaling error. The second process agent raises an interrupt request, wherein the interrupt request is based on the detecting, by a second processing element, that an error exception has occurred. Execution can be ceased and a state of the second process agent can be stored based on the interrupt request. A done signal to a third process agent is withheld by the second process agent, wherein the third process agent is running on a third processing element. A fire signal from a fourth process agent is withheld by the second process agent, where the fourth process agent is running on a fourth processing element.

The figure shows error exception detect and interrupt request raising. The circuit 400 includes a first processing element 410, a second processing element 420, and a third processing element 430. A first FIFO 440 FIFO1 is configured and disposed to receive data from processing element 410. A second FIFO 442 FIFO2 is configured and disposed to receive data from processing element 420. A third FIFO 444 FIFO3 is configured and disposed to receive data from processing element 430. A first process agent, agent 1 412, executes on processing element 410. A second process agent, agent 2 422, executes on processing element 420. A third process agent 432 executes on processing element 430. In embodiments, the FIFOs can comprise blocks of memory designated by starting addresses and ending addresses (not shown). The FIFOs can be addressed using pointers. In embodiments, the FIFOS 440 and 444 may be of different sizes. As indicated in the figure, FIFO1 440 is allocated to include five blocks of memory (indicated by shaded blocks within FIFO1 440) and FIFO3 is allocated to include three blocks of memory (indicated by the shaded blocks within FIFO3 444). Thus, the FIFO sizes can be different. The sizes of the respective FIFOs can be determined based on a variety of factors such as output data rates and/or latency requirements of the process agents.

A second process agent 422 (AGENT2) operates as an agent representing a node of the data flow graph. The second process agent 422 executes on processing element 420. The second process agent can read data from either or both FIFO1 440 and FIFO3 444 once the data in each FIFO is determined to be valid. Signals such as the FIRE signals and DONE signals can be used to synchronize data flow between or among processing elements. In embodiments, the first process agent 412 issues a FIRE1 signal to the second process agent 422 to indicate the presence of valid data in FIFO1 440. Similarly, the third process agent 432 can issue a FIRE3 signal to the second process agent 422 to indicate the presence of valid data in FIFO3 444. The second process agent 422 issues a $DONE2_1$ signal to a first process agent 412 upon completion of reading data from FIFO1 440. This signal serves as an indication to process agent 1 412 that the FIFO1 440 is ready to receive new data. Similarly, the second process agent 422 issues a $DONE2_3$ signal to the third process agent 432 upon completion of reading data from FIFO3 444. This signal serves as an indication to process agent 3 432 that the FIFO3 444 is ready to receive new data. The second process agent 422 executes the received data from the one or more upstream process agents (agent 412 or agent 432). The result of the execution is written to FIFO2 442, the contents of which can then be retrieved by another downstream processing element (not shown). Once the result of the execution is written to FIFO2 442, the processing element 420 asserts FIRE2 signal to indicate to a downstream process agent that new data is available in FIFO2 442. Once the data is consumed by the downstream process agent, the downstream processing element asserts the DONE4 signal to indicate that the result has been successfully retrieved from FIFO2 442.

The second processing element 420 from the plurality of processing elements can detect that an error exception 424 has occurred. The second process agent 422 is running on the second processing element 420. An error exception can occur due to a variety of processing states, computations, communications, and so on. In embodiments, the error exception includes an arithmetic exception. An arithmetic exception can include an invalid or illegal operation, a number representation error, and the like. In embodiments, the arithmetic exception can include a divide by zero exception. Division by zero is undefined and represents an illegal arithmetic operation. In embodiments, the arithmetic exception includes an underflow exception. Underflow can occur when a number is too small to be represented or when a negative number representation "wraps" to become a positive number (an invalid representation). In other embodiments, the arithmetic exception includes an overflow exception. In further embodiments, the error exception can include a signaling error. A signaling error can result from data being unavailable, processing elements not responding, and the like. In embodiments, the signaling error can include a direct memory access abort, a buffer overflow, a buffer underflow, excessive saturation, or an excessive re-computation attempt.

A done signal $DONE2_3$ to a third process agent 432 can be withheld 426 by the second process agent 422. The third process agent 432 can be running on a third processing element 430 from the plurality of processing elements. Since detection of an error exception 424 can indicate an arithmetic exception, a signaling error, and so on, one or more techniques can be used to determine both the cause of the exception and how to remedy the exception. Withholding a done signal can ensure that the agent that would normally receive the done signal will remain in a waiting state or suspended state, for example. The second process agent 422 can raise an interrupt request (IRQ) 428, where the interrupt can be based on the detecting, by the second processing element 420 from the plurality of processing elements, that an error exception has occurred. The IRQ can cause execution by a process agent of valid data, such as process agent 3 432, to cease. The IRQ can also cause a state of process agent, such as the third process agent 432, to be stored based on the interrupt request. The IRQ can be processed by an interrupt handler, where the interrupt handler can be included in an execution manager. The execution manager can be part of a host outside of the reconfigurable fabric.

Figure 5:
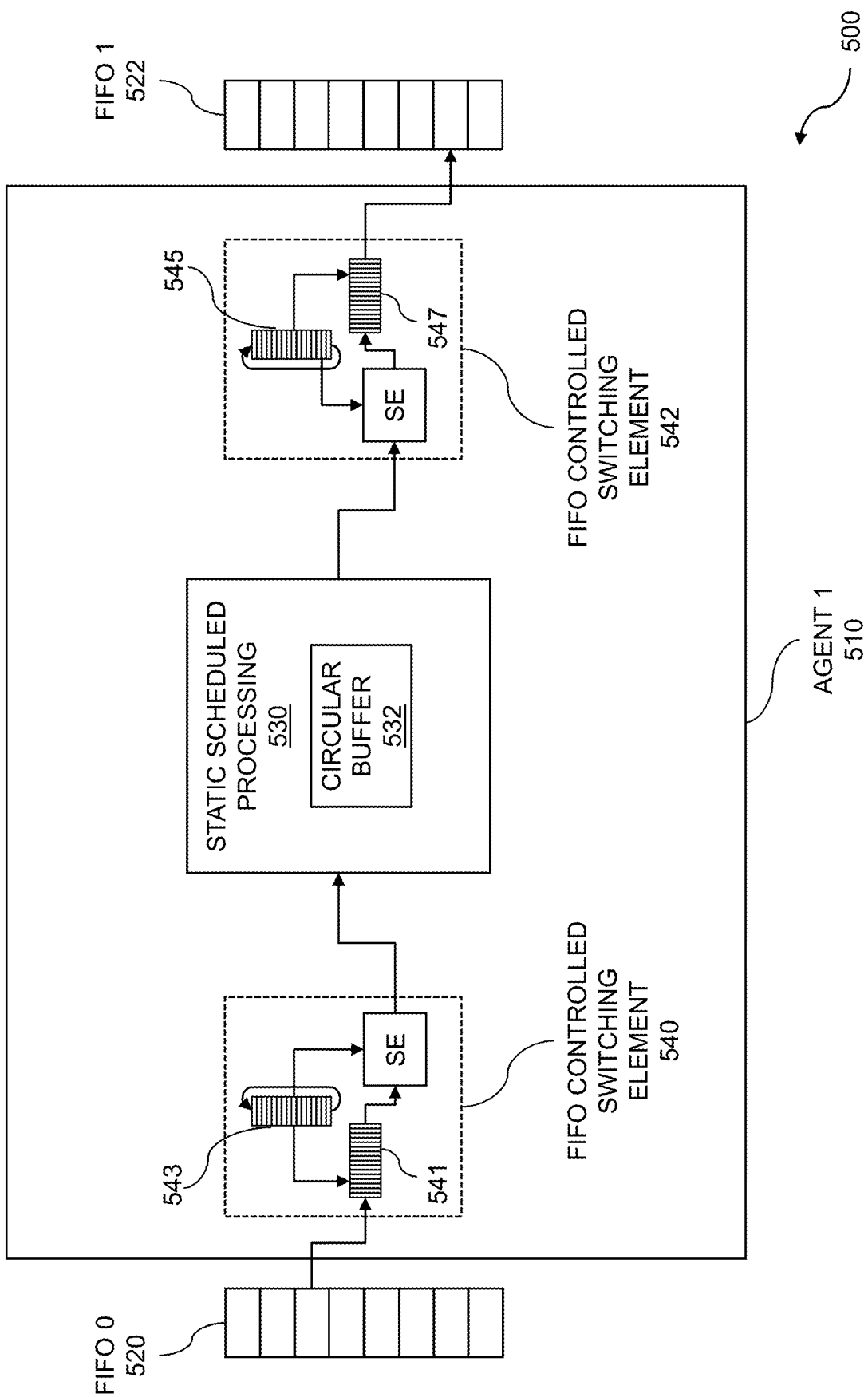
FIG. 5 shows scheduled sections relating to an agent.

FIG. 5 shows scheduled sections relating to an agent 500. An agent can be one of a plurality of agents which support data flow graph computation using exceptions. A plurality of processing elements is configured to implement a data flow graph. The plurality of processing elements is loaded with a plurality of process agents. Valid data is executed by a first process agent on a first processing element, where the first process agent corresponds to a starting node of the data flow graph. A second processing element detects that an error exception has occurred, where a second process agent runs on the second processing element. The second process agent withholds a done signal to a third process agent, where the third process agent is running on a third processing element.

The figure shows an example 500 of scheduled sections relating to an agent. A FIFO 520 serves as an input FIFO for a control agent 510. Data from FIFO 520 is read into local buffer 541 of a FIFO controlled switching element 540. Circular buffer 543 may contain instructions that are executed by a switching element (SE), and may modify data based on one or more logical operations, including, but not limited to, XOR, OR, AND, NAND, and/or NOR. The plurality of processing elements can be controlled by circular buffers. The modified data may be passed to a circular buffer 532 under static scheduled processing 530. Thus, the scheduling of circular buffer 532 may be performed at compile time. The instructions loaded into circular buffer 532 may occur as part of a program initialization, and remain in the circular buffer 532 throughout the execution of the program (control agent). The circular buffer 532 may provide data to another FIFO controlled switching element 542. Circular buffer 545 may rotate to provide a plurality of instructions/operations to modify and/or transfer data to data buffer 547, which is then transferred to an external FIFO 522.

A process agent can include multiple components. An input component handles retrieval of data from an input FIFO. For example, agent 510 receives input from FIFO 520. An output component handles the sending of data to an output FIFO. For example, agent 510 provides data to FIFO 522. A signaling component can send a signal to process agents executing on neighboring processing elements about conditions of a FIFO. For example, a process agent can issue a FIRE signal to another process agent operating on another processing element when new data is available in a FIFO that was previously empty. Similarly, a process agent can issue a DONE signal to another process agent operating on another processing element when new space is available in a FIFO that was previously full. In this way, the process agent facilitates communication of data and FIFO states amongst neighboring processing elements to enable complex computations with multiple processing elements in an interconnected topology.

Figure 6:
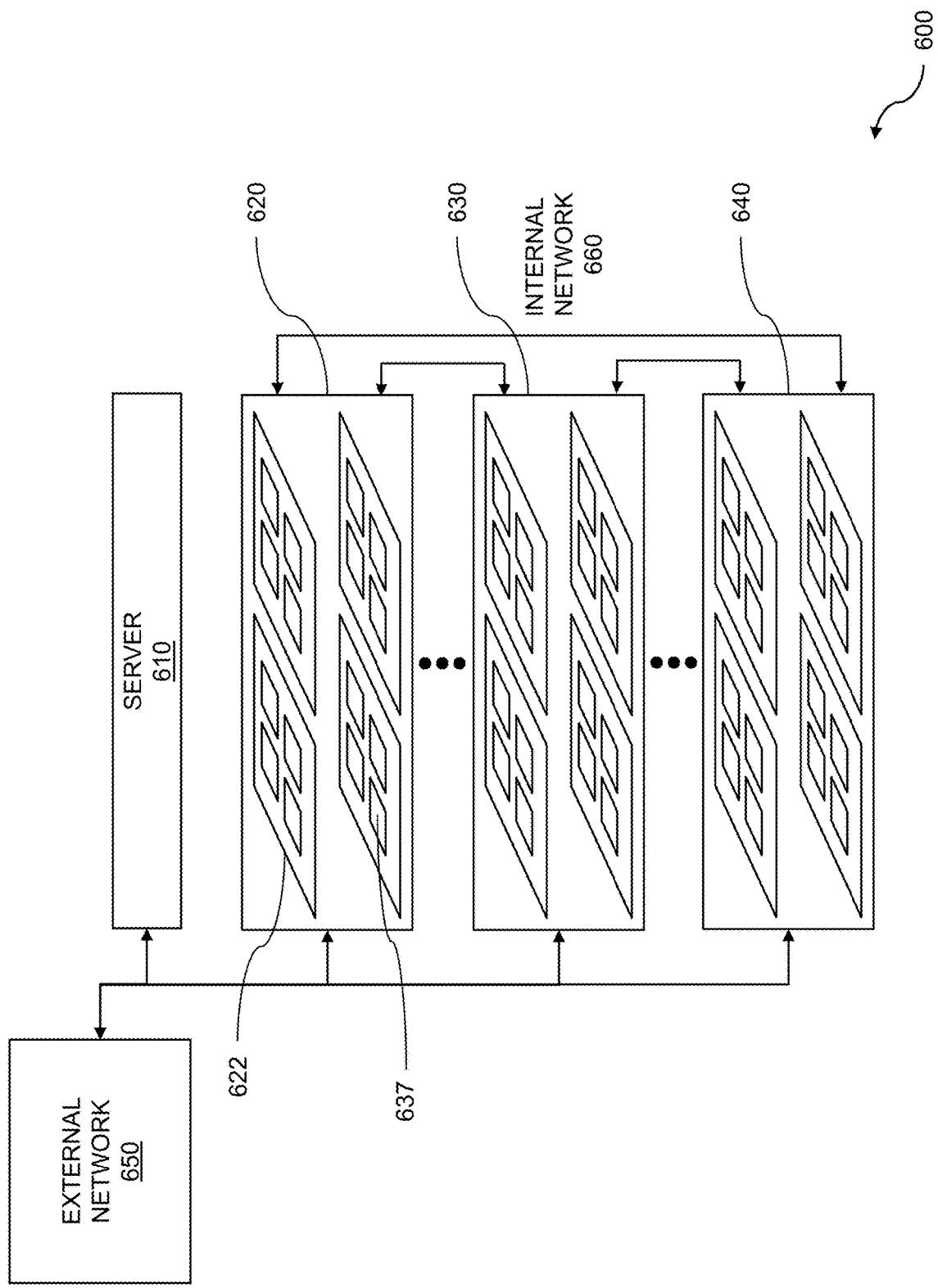
FIG. 6 illustrates a server allocating FIFOs and processing elements.

FIG. 6 illustrates a server allocating FIFOs and processing elements. First in first out (FIFO) techniques can be used to support data flow graph computation using exceptions. The FIFOs can be scheduled, coded, or programmed to configure the processing elements, where the processing elements can be within a reconfigurable fabric. The processing elements can be loaded with a plurality of process agents. A first process agent can be used to execute valid data, where the first agent can correspond to a starting note of the data flow graph. A second processing element can detect that an error exception has occurred, where a second agent is running on the second processing element. The second process agent can withhold a done signal to a third agent running on a third processing element.

In embodiments, system 600 includes one or more boxes, indicated by callouts 620, 630, and 640. Each box may have one or more boards, indicated generally as 622. Each board comprises one or more chips, indicated generally as 637. Each chip may include one or more processing elements, where at least some of the processing elements may execute a process agent. An internal network 660 allows for communication between the boxes such that processing elements on one box can provide and/or receive results from processing elements on another box.

The server 610 may be a computer executing programs on one or more processors based on instructions contained in a non-transitory computer readable medium. The server 610 may perform reconfiguring of a mesh networked computer system comprising a plurality of processing elements with a FIFO between one or more pairs of processing elements. In some embodiments, each pair of processing elements has a dedicated FIFO configured to pass data between the processing elements of the pair. The server 610 may receive instructions and/or input data from an external network 650. The external network may provide information that includes, but is not limited to, hardware description language instructions (e.g. Verilog, VHDL, or the like), flow graphs, source code, or information in another suitable format.

The server 610 may collect performance statistics on the operation of the collection of processing elements. The performance statistics can include number of fork operations, join operations, average sleep time of a processing element, and/or a histogram of the sleep time of each processing element. Any outlier processing elements that sleep for a longer time than a predetermined threshold allows can be identified. In embodiments, the server can resize FIFOs or create new FIFOs to reduce the sleep time of a processing element that exceeds the predetermined threshold. Sleep time is essentially time when a processing element is not producing meaningful results, so it is generally desirable to minimize the amount of time a processing element spends in a sleep mode. In some embodiments, the server 610 may serve as an allocation manager to process requests for adding or freeing FIFOs, and/or changing the size of existing FIFOs in order to optimize operation of the processing elements.

In some embodiments, the server may receive optimization settings from the external network 650. The optimization settings may include a setting to optimize for speed, optimize for memory usage, or balance between speed and memory usage. Additionally, optimization settings may include constraints on the topology, such as a maximum number of paths that may enter or exit a processing element, maximum data block size, and other settings. Thus, the server 610 can perform a reconfiguration based on user-specified parameters via external network 650.

Figure 7:
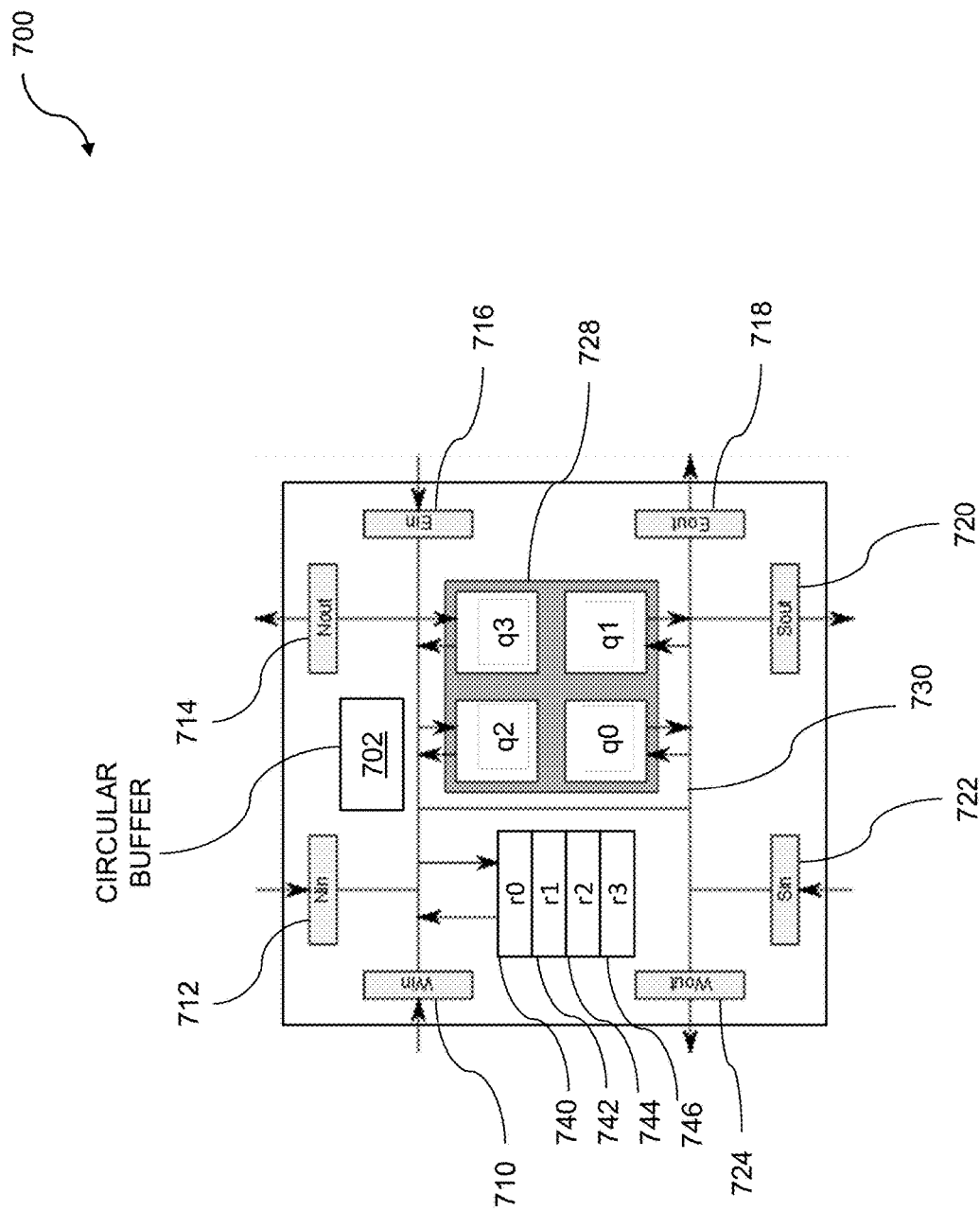
FIG. 7 shows a cluster for coarse-grained reconfigurable processing.

FIG. 7 shows a cluster for coarse-grained reconfigurable processing. The cluster for coarse-grained reconfigurable processing 700 can be used for data flow graph computation using exceptions. The exceptions can include configuring processing elements within a reconfigurable fabric to implement the data flow graph. The processing elements such as clusters or quads of processing elements on the reconfigurable fabric can include processing elements, switching elements, storage elements, etc. The plurality of processing elements can be loaded with a plurality of process agents. Valid data can be executed by a first process agent on a first processing element from the plurality of processing elements. The first process agent can correspond to a starting node of the data flow graph. A second processing element from the plurality of processing elements detects that an error exception has occurred, where a second process agent is running on the second processing element. An error exception can be attributable to an arithmetic exception such as division by zero, an underflow, or an overflow; or a signaling error such as a direct memory access (DMA) abort; buffer overflow, underflow, or excessive saturation; or an excessive computation attempt. A done signal is withheld by the second process agent, to a third process agent, where the third process agent is running on a third processing element from the plurality of processing elements. Polling of the processing elements is used to identify an error state.

The cluster 700 comprises a circular buffer 702. The circular buffer 702 can be referred to as a main circular buffer or a switch-instruction circular buffer. In some embodiments, the cluster 700 comprises additional circular buffers corresponding to processing elements within the cluster. The additional circular buffers can be referred to as processor instruction circular buffers. The example cluster 700 comprises a plurality of logical elements, configurable connections between the logical elements, and a circular buffer 702 controlling the configurable connections. The logical elements can further comprise one or more of switching elements, processing elements, or storage elements. The example cluster 700 also comprises four processing elements—q0, q1, q2, and q3. The four processing elements can collectively be referred to as a "quad," and can be jointly indicated by a grey reference box 728. In embodiments, there is intercommunication among and between each of the four processing elements. In embodiments, the circular buffer 702 controls the passing of data to the quad of processing elements 728 through switching elements. In embodiments, the four processing elements 728 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message transfer via a bus or shared memory interface. Power gating can be applied to one or more processors (e.g. q1) in order to reduce power.

The cluster 700 can further comprise storage elements coupled to the configurable connections. As shown, the cluster 700 comprises four storage elements—r0 740, r1 742, r2 744, and r3 746. The cluster 700 further comprises a north input (Nin) 712, a north output (Nout) 714, an east input (Ein) 716, an east output (Eout) 718, a south input (Sin) 722, a south output (Sout) 720, a west input (Win) 710, and a west output (Wout) 724. The circular buffer 702 can contain switch instructions that implement configurable connections. For example, an instruction effectively connects the west input 710 with the north output 714 and the east output 718 and this routing is accomplished via bus 730. The cluster 700 can further comprise a plurality of circular buffers residing on a semiconductor chip where the plurality of circular buffers controls unique, configurable connections between the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

A preprocessor or compiler can be configured to prevent data collisions within the circular buffer 702. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 724 to an instruction placing data on the south output 720, such that the data can be output on both output ports within the same pipeline cycle. In a case where data needs to travel to a cluster that is both south and west of the cluster 700, it can be more efficient to send the data directly to the south output port rather than to store the data in a register first, and then to send the data to the west output on a subsequent pipeline cycle.

An L2 switch interacts with the instruction set. A switch instruction typically has both a source and a destination. Data is accepted from the source and sent to the destination. There are several sources (e.g. any of the quads within a cluster, any of the L2 directions North, East, South, West, a switch register, or one of the quad RAMs—data RAM, IRAM, PE/Co Processor Register). As an example, to accept data from any L2 direction, a "valid" bit is used to inform the switch that the data flowing through the fabric is indeed valid. The switch will select the valid data from the set of specified inputs. For this to function properly, only one input can have valid data, and the other inputs must all be marked as invalid. It should be noted that this fan-in operation at the switch inputs operates independently for control and data. There is no requirement for a fan-in mux to select data and control bits from the same input source. Data valid bits are used to select valid data, and control valid bits are used to select the valid control input. There are many sources and destinations for the switching element, which can result in excessive instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can perform any safe function of the two inputs. For example, the fan-in could implement a logical OR of the input data. Any output data is acceptable because the input condition is an error, so long as no damage is done to the silicon. In the event that a bit is set to '1' for both inputs, an output bit should also be set to '1'. A switch instruction can accept data from any quad or from any neighboring L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical, or a combination (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A" to initiate a transfer of data between cluster "B" and cluster "C" without any involvement of the processing elements in clusters "B" and "C". Furthermore, cluster "A" can initiate a fan-out transfer of data from cluster "B" to clusters "C", "D", and so on, where each destination cluster writes a copy of the DMA data to different locations within their Quad RAMs. A DMA mechanism may also be used for programming instructions into the instruction RAMs.

Accesses to RAM in different clusters can travel through the same DMA path, but the transactions must be separately defined. A maximum block size for a single DMA transfer can be 8 KB. Accesses to data RAMs can be performed either when the processors are running or while the processors are in a low power "sleep" state. Accesses to the instruction RAMs and the PE and Co-Processor Registers may be performed during configuration mode. The quad RAMs may have a single read/write port with a single address decoder, thus allowing shared access by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

In embodiments, the computations that can be performed on a cluster for coarse-grained reconfigurable processing can be represented by a data flow graph. Data flow processors, data flow processor elements, and the like, are particularly well suited to processing the various nodes of data flow graphs. The data flow graphs can represent communications between and among agents, matrix computations, tensor manipulations, Boolean functions, and so on. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of high quality data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs arranged in configurations such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value of minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0 then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the clusters enter the configuration mode, various techniques, including direct memory access (DMA) can be used to load instructions from the kernel into instruction memories of the PEs. The clusters that were preprogrammed to enter configuration mode can also be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as those based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

A reconfigurable fabric can include quads of elements. The elements of the reconfigurable fabric can include processing elements, switching elements, storage elements, and so on. An element such as a storage element can be controlled by a rotating circular buffer. In embodiments, the rotating circular buffer can be statically scheduled. The data operated on by the agents that are resident within the reconfigurable buffer can include tensors. Tensors can include one or more blocks. The reconfigurable fabric can be configured to process tensors, tensor blocks, tensors and blocks, etc. One technique for processing tensors includes deploying agents in a pipeline. That is, the output of one agent can be directed to the input of another agent. Agents can be assigned to clusters of quads, where the clusters can include one or more quads. Multiple agents can be pipelined when there are sufficient clusters of quads to which the agents can be assigned. Multiple pipelines can be deployed. Pipelining of the multiple agents can reduce the sizes of input buffers, output buffers, intermediate buffers, and other storage elements. Pipelining can further reduce memory bandwidth needs of the reconfigurable fabric.

Agents can be used to support dynamic reconfiguration of the reconfigurable fabric. The agents that support dynamic reconfiguration of the reconfigurable fabric can include interface signals in a control unit. The interface signals can include suspend, agent inputs empty, agent outputs empty, and so on. The suspend signal can be implemented using a variety of techniques such as a semaphore, a streaming input control signal, and the like. When a semaphore is used, the agent that is controlled by the semaphore can monitor the semaphore. In embodiments, a direct memory access (DMA) controller can wake the agent when the setting of the semaphore has been completed. The streaming control signal, if used, can wake a control unit if the control unit is sleeping. A response received from the agent can be configured to interrupt the host software.

The suspend semaphore can be asserted by runtime software in advance of commencing dynamic reconfiguration of the reconfigurable fabric. Upon detection of the semaphore, the agent can begin preparing for entry into a partially resident state. A partially resident state for the agent can include having the agent control unit resident after the agent kernel is removed. The agent can complete processing of any currently active tensor being operated on by the agent. In embodiments, a done signal and a fire signal may be sent to upstream or downstream agents, respectively. A done signal can be sent to the upstream agent to indicate that all data has been removed from its output buffer. A fire signal can be sent to a downstream agent to indicate that data in the output buffer is ready for processing by the downstream agent. The agent can continue to process incoming done signals and fire signals but will not commence processing of any new tensor data after completion of the current tensor processing by the agent. The semaphore can be reset by the agent to indicate to a host that the agent is ready to be placed into partial residency. In embodiments, having the agent control unit resident after the agent kernel is removed comprises having the agent partially resident. A control unit may not assert one or more signals, nor expect one or more responses from a kernel in the agent, when a semaphore has been reset.

Other signals from an agent can be received by a host. The signals can include an agent inputs empty signal, an agent outputs empty signal, and so on. The agent inputs empty signal can be sent from the agent to the host and can indicate that the input buffers are empty. The agent inputs empty signal can only be sent from the agent when the agent is partially resident. The agent outputs empty signal can be sent from the agent to the host and can indicate that the output buffers are empty. The agent outputs empty can only be sent from the agent to the host when the agent is partially resident. When the runtime (host) software receives both signals, agent inputs empty and agent outputs empty, from the partially resident agent, the agent can be swapped out of the reconfigurable fabric and can become fully vacant.

Recall that an agent can be one of a plurality of agents that form a data flow graph. The data flow graph can be based on a plurality of subgraphs. The data flow graph can be based on agents which can support three states of residency: fully resident, partially resident, and fully vacant. A complete subsection (or subgraph) based on the agents that support the three states of residency can be swapped out of the reconfigurable fabric. The swapping out of the subsection can be based on asserting a suspend signal input to an upstream agent. The asserting of the suspend signal can be determined by the runtime software. When a suspend signal is asserted, the agent can stop consuming input data such as an input sensor. The tensor can queue within the input buffers of the agent. The agent kernel can be swapped out of the reconfigurable fabric, leaving the agent partially resident while the agent waits for the downstream agents to drain the output buffers for the agent. When an upstream agent is fully resident, the agent may not be able to be fully vacant because a fire signal might be sent to the agent by the upstream agent. When the upstream agent is partially resident or is fully vacant, then the agent can be fully vacated from the reconfigurable fabric. The agent can be fully vacated if it asserts both the input buffers empty and output buffers empty signals.

Figure 8:
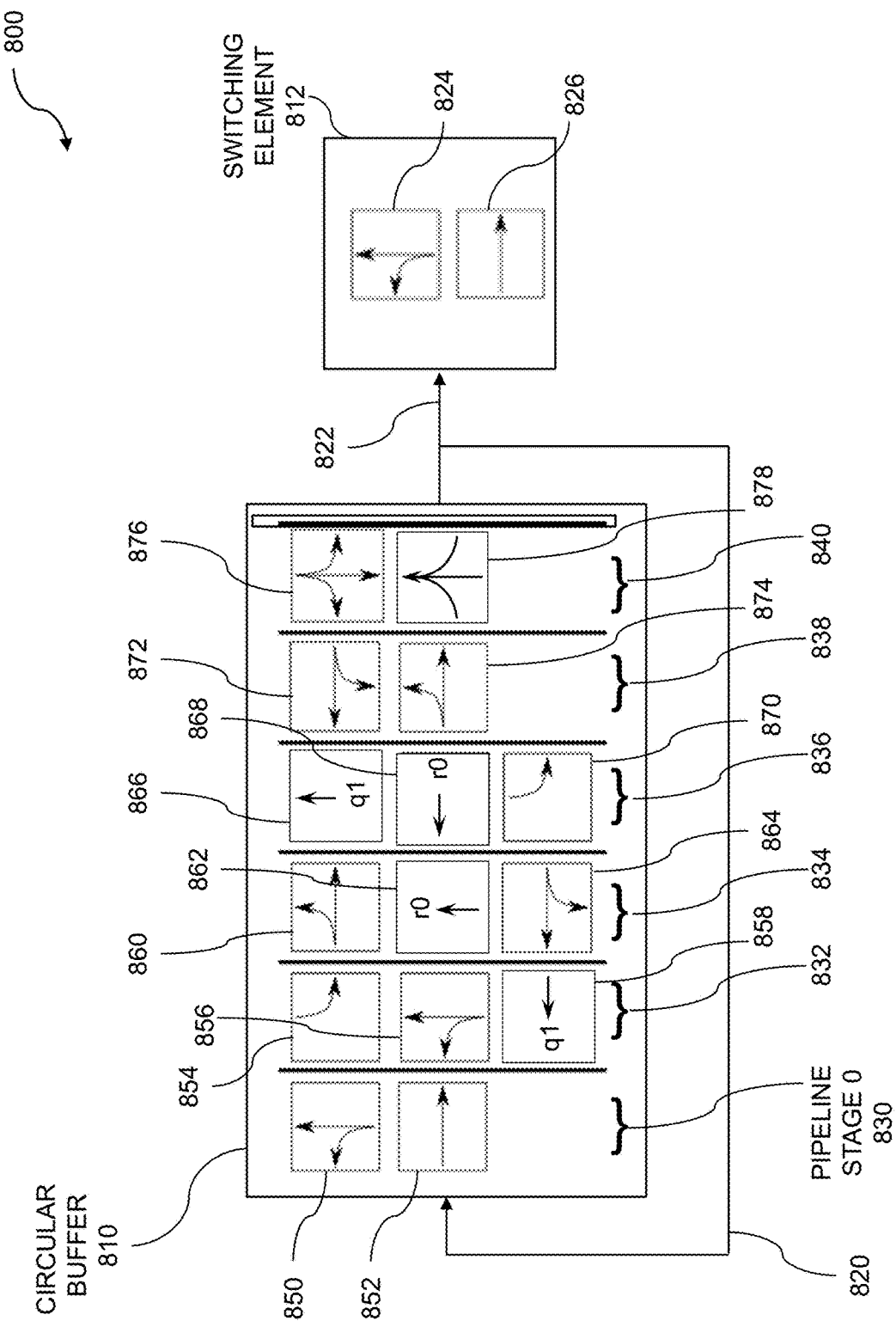
FIG. 8 illustrates a block diagram of a circular buffer.

FIG. 8 illustrates a block diagram of a circular buffer. The circular buffer 810 can include a switching element 812 corresponding to the circular buffer. The circular buffer and the corresponding switching element can be used in part for data flow graph computation using exceptions. Using the circular buffer 810 and the corresponding switching element 812, data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The block diagram 800 describes a processor-implemented method for data manipulation. The circular buffer 810 contains a plurality of pipeline stages. Each pipeline stage contains one or more instructions, up to a maximum instruction depth. In the embodiment shown in FIG. 8, the circular buffer 810 is a 6×3 circular buffer, meaning that it implements a six-stage pipeline with an instruction depth of up to three instructions per stage (column). Hence, the circular buffer 810 can include one, two, or three switch instruction entries per column. In some embodiments, the plurality of switch instructions per cycle can comprise two or three switch instructions per cycle. However, in certain embodiments, the circular buffer 810 supports only a single switch instruction in a given cycle. In the example block diagram 800 shown, Pipeline Stage 0 830 has an instruction depth of two instructions 850 and 852. Though the remaining pipeline stages 1-5 are not textually labeled in the block diagram 800, the stages are indicated by callouts 832, 834, 836, 838, and 840. Pipeline stage 1 832 has an instruction depth of three instructions 854, 856, and 858. Pipeline stage 2 834 has an instruction depth of three instructions 860, 862, and 864. Pipeline stage 3 836 also has an instruction depth of three instructions 866, 868, and 870. Pipeline stage 4 838 has an instruction depth of two instructions 872 and 874. Pipeline stage 5 840 has an instruction depth of two instructions 876 and 878. In embodiments, the circular buffer 810 includes 64 columns. During operation, the circular buffer 810 rotates through configuration instructions. The circular buffer 810 can dynamically change operation of the logical elements based on the rotation of the circular buffer. The circular buffer 810 can comprise a plurality of switch instructions per cycle for the configurable connections.

The instruction 852 is an example of a switch instruction. In embodiments, each cluster has four inputs and four outputs, each designated within the cluster's nomenclature as "north," "east," "south," and "west" respectively. For example, the instruction 852 in the diagram 800 is a west-to-east transfer instruction. The instruction 852 directs the cluster to take data on its west input and send out the data on its east output. In another example of data routing, the instruction 850 is a fan-out instruction. The instruction 850 instructs the cluster to take data from its south input and send out on the data through both its north output and its west output. The arrows within each instruction box indicate the source and destination of the data. The instruction 878 is an example of a fan-in instruction. The instruction 878 takes data from the west, south, and east inputs and sends out the data on the north output. Therefore, the configurable connections can be considered to be time multiplexed.

In embodiments, the clusters implement multiple storage elements in the form of registers. In the example block diagram 800 shown, the instruction 862 is a local storage instruction. The instruction 862 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

The obtaining data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of sleep state when the transfer is complete. This waking is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of sleep by the arrival of valid data (or control) following the execution of a switch instruction. A processing element or switching element can determine why it was brought out of a sleep state by the context of the code that the element starts to execute. A cluster can be awoken during a DMA operation by the arrival of valid data. The DMA instruction can be executed while the cluster remains asleep and awaits the arrival of valid data. Upon arrival of the valid data, the cluster is woken and the data stored. Accesses to one or more data random access memories (RAM) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 858 is a processing instruction. The instruction 858 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example block diagram 800 shown, the circular buffer 810 rotates instructions in each pipeline stage into the switching element 812 via a forward data path 822, and also back to a pipeline stage 0 830 via a feedback data path 820. Instructions can include switching instructions, storage instructions, and processing instructions, among others. The feedback data path 820 can allow instructions within the switching element 812 to be transferred back to the circular buffer. Hence, the instructions 824 and 826 in the switching element 812 can also be transferred back to pipeline stage 0 as the instructions 850 and 852. In addition to the instructions depicted on FIG. 8, a no-op instruction can also be inserted into a pipeline stage. In embodiments, a no-op instruction causes execution to not be performed for a given cycle. In effect, the introduction of a no-op instruction can cause a column within the circular buffer 810 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using null convention logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by a stimulus external to the logical element and not based on the programming of the logical element. The external stimulus can include an input signal, which in turn can cause a wake up or an interrupt service request to execute on one or more of the logical elements. An example of such a wake-up request can be seen in the instruction 858, assuming that the processor q1 was previously in a sleep state. In embodiments, when the instruction 858 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 866. In the case of the instruction 866, data from the processor q1 is moved to the north output. In some embodiments, if Xs have been placed into the processor q1, such as during the instruction 858, then Xs would be retrieved from the processor q1 during the execution of the instruction 866 and would be applied to the north output of the instruction 866.

A collision occurs if multiple instructions route data to a particular port in a given pipeline stage. For example, if instructions 852 and 854 are in the same pipeline stage, they will both send data to the east output at the same time, thus causing a collision since neither instruction is part of a time-multiplexed fan-in instruction (such as the instruction 878). To avoid potential collisions, certain embodiments use preprocessing, such as by a compiler, to arrange the instructions in such a way that there are no collisions when the instructions are loaded into the circular buffer. Thus, the circular buffer 810 can be statically scheduled in order to prevent data collisions. Thus, in embodiments, the circular buffers are statically scheduled. In embodiments, when the preprocessor detects a data collision, the scheduler changes the order of the instructions to prevent the collision. Alternatively, or additionally, the preprocessor can insert further instructions such as storage instructions (e.g. the instruction 862), sleep instructions, or no-op instructions, to prevent the collision. Alternatively, or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the Read transfer is mastered by the DMA controller in the interface. It includes a credit count that keeps track of the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will make sure the memory bit is reset to 0 which thereby prevents a microDMA controller in the source cluster from sending more data.

Each slave interface manages four interfaces between the FIFOs and the fabric. Each interface can contain up to 15 data channels. Therefore, a slave should manage read/write queues for up to 60 channels. Each channel can be programmed to be a DMA channel, or a streaming data channel. DMA channels are managed using a DMA protocol. Streaming data channels are expected to maintain their own form of flow control using the status of the Rx FIFOs (obtained using a query mechanism). Read requests to slave interfaces use one of the flow control mechanisms described previously.

Figure 9:
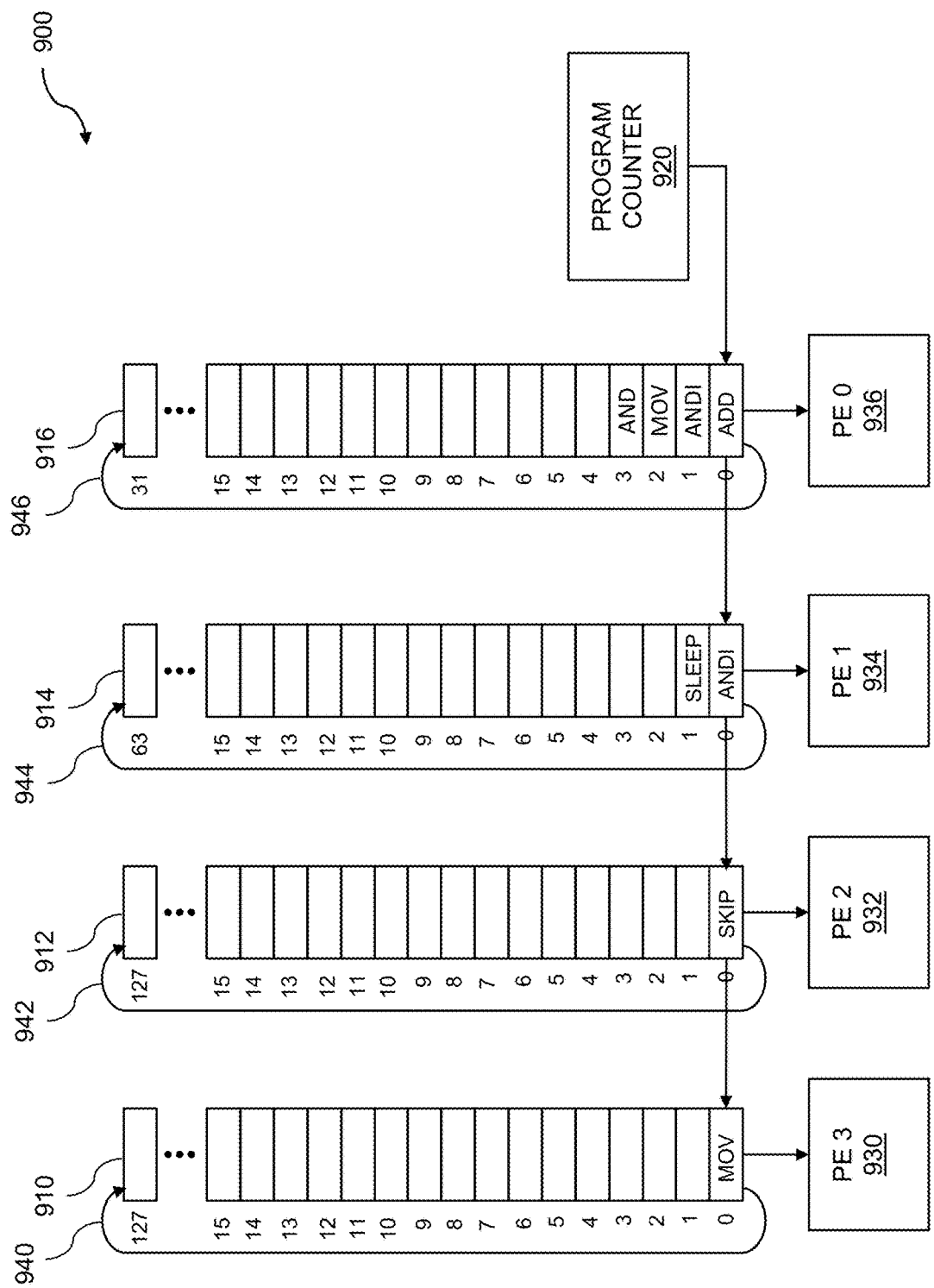
FIG. 9 shows circular buffers and processing elements.

FIG. 9 shows circular buffers and processing elements. A diagram 900 indicates example instruction execution for processing elements. The processing elements can include a portion of or all of the elements within a reconfigurable fabric. The instruction execution can include instructions for data flow graph computation using exceptions. A circular buffer 910 feeds a processing element 930. A second circular buffer 912 feeds another processing element 932. A third circular buffer 914 feeds another processing element 934. A fourth circular buffer 916 feeds another processing element 936. The four processing elements 930, 932, 934, and 936 can represent a quad of processing elements. In embodiments, the processing elements 930, 932, 934, and 936 are controlled by instructions received from the circular buffers

910, 912, 914, and 916. The circular buffers can be implemented using feedback paths 940, 942, 944, and 946, respectively. In embodiments, the circular buffer can control the passing of data to a quad of processing elements through switching elements, where each of the quad of processing elements is controlled by four other circular buffers (as shown in the circular buffers 910, 912, 914, and 916) and where data is passed back through the switching elements from the quad of processing elements where the switching elements are again controlled by the main circular buffer. In embodiments, a program counter 920 is configured to point to the current instruction within a circular buffer. In embodiments with a configured program counter, the contents of the circular buffer are not shifted or copied to new locations on each instruction cycle. Rather, the program counter 920 is incremented in each cycle to point to a new location in the circular buffer. The circular buffers 910, 912, 914, and 916 can contain instructions for the processing elements. The instructions can include, but are not limited to, move instructions, skip instructions, logical AND instructions, logical AND-Invert (e.g. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction and the instruction in the circular buffer can be ignored and the corresponding operation not performed.

The plurality of circular buffers can have differing lengths. That is, the plurality of circular buffers can comprise circular buffers of differing sizes. In embodiments, the first two circular buffers 910 and 912 have a length of 128 instructions, the third circular buffer 914 has a length of 64 instructions, and the fourth circular buffer 916 has a length of 32 instructions, but other circular buffer lengths are also possible, and in some embodiments, all buffers have the same length. The plurality of circular buffers that have differing lengths can resynchronize with a zeroth pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 9, different circular buffers can have different instruction sets within them. For example, the first circular buffer 910 contains a MOV instruction. The second circular buffer 912 contains a SKIP instruction. The third circular buffer 914 contains a SLEEP instruction and an ANDI instruction. The fourth circular buffer 916 contains an AND instruction, a MOVE instruction, an ANDI instruction, and an ADD instruction. The operations performed by the processing elements 930, 932, 934, and 936 are dynamic and can change over time, based on the instructions loaded into the respective circular buffers. As the circular buffers rotate, new instructions can be executed by the respective processing element.

Figure 10:
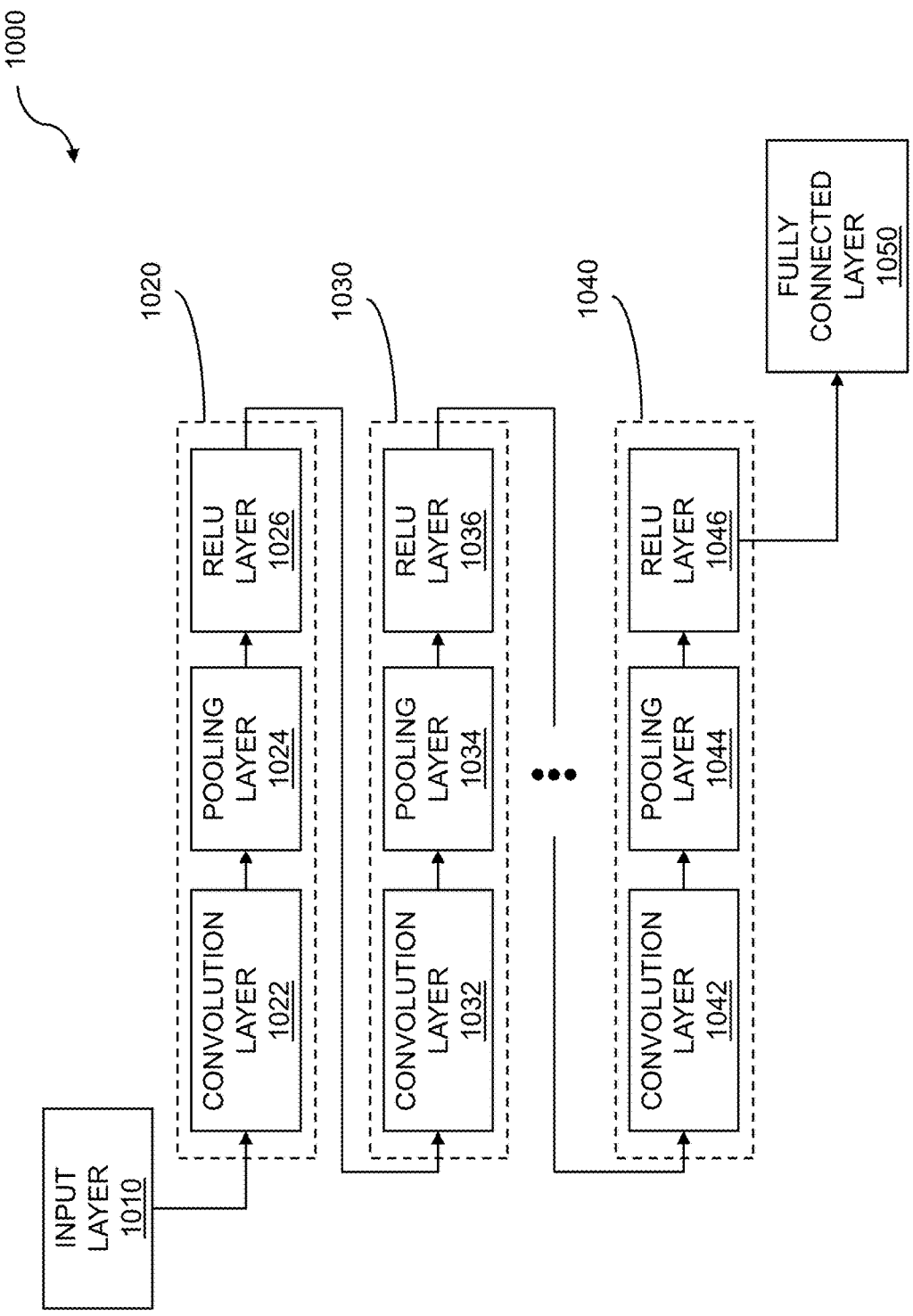
FIG. 10 shows a deep learning block diagram.

FIG. 10 shows a deep learning block diagram. The deep learning block diagram 1000 can include a neural network such as a deep neural network (DNN), a convolutional neural network (CNN), a recurrent neural network (RNN), and so on. A convolutional neural network can be based on layers, where the layers can include input layers, output layers, fully connected layers, convolution layers, pooling layers, rectified linear unit (ReLU) layers, bottleneck layers, and so on. The layers of the convolutional network can be implemented using a reconfigurable fabric. The reconfigurable fabric can include processing elements, switching elements, storage elements, etc. The reconfigurable fabric can be used to perform various operations such as logical operations. Deep learning can be applied to data flow graph computing using exceptions.

A deep learning block diagram 1000 is shown. The block diagram can include various layers, where the layers can include an input layer, hidden layers, a fully connected layer, and so on. In some embodiments, the deep learning block diagram can include a classification layer. The input layer 1010 can receive input data, where the input data can include a first collected data group, a second collected data group, a third collected data group, a fourth collected data group, etc. The collecting of the data groups can be performed in a first locality, a second locality, a third locality, a fourth locality, and so on, respectively. The input layer can then perform processing such as partitioning collected data into non-overlapping partitions. The deep learning block diagram 1000, which can represent a network such as a convolutional neural network, can contain a plurality of hidden layers. While three hidden layers, a first hidden layer 1020, a second hidden layer 1030, and a third hidden layer 1040 are shown, other numbers of hidden layers may be present. Each hidden layer can include layers that perform various operations, where the various layers can include a convolution layer, a pooling layer, and a rectified layer such as a rectified linear unit (ReLU) layer. Thus, a first layer 1020 can include a convolution layer 1022, a pooling layer 1024, and a ReLU layer 1026; a second layer 1030 can include a convolution layer 1032, a pooling layer 1034, and a ReLU layer 1036; and a third layer 1040 can include a convolution layer 1042, a pooling layer 1044, and a ReLU layer 1046. The convolution layers 1022, 1032, and 1042 can perform convolution operations; the pooling layers 1024, 1034, and 1044 can perform pooling operations, including max pooling, such as data down-sampling; and the ReLU layers 1026, 1036, and 1046 can perform rectification operations. A convolutional layer can reduce the amount of data feeding into a fully connected layer. The block diagram 1000 can include a fully connected layer 1050. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs configured in arrangements such as quads can be coupled to arithmetic units, where the arithmetic units can be coupled to or included in data processing units (DPU). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0 then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence the operation of an entire system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 11:
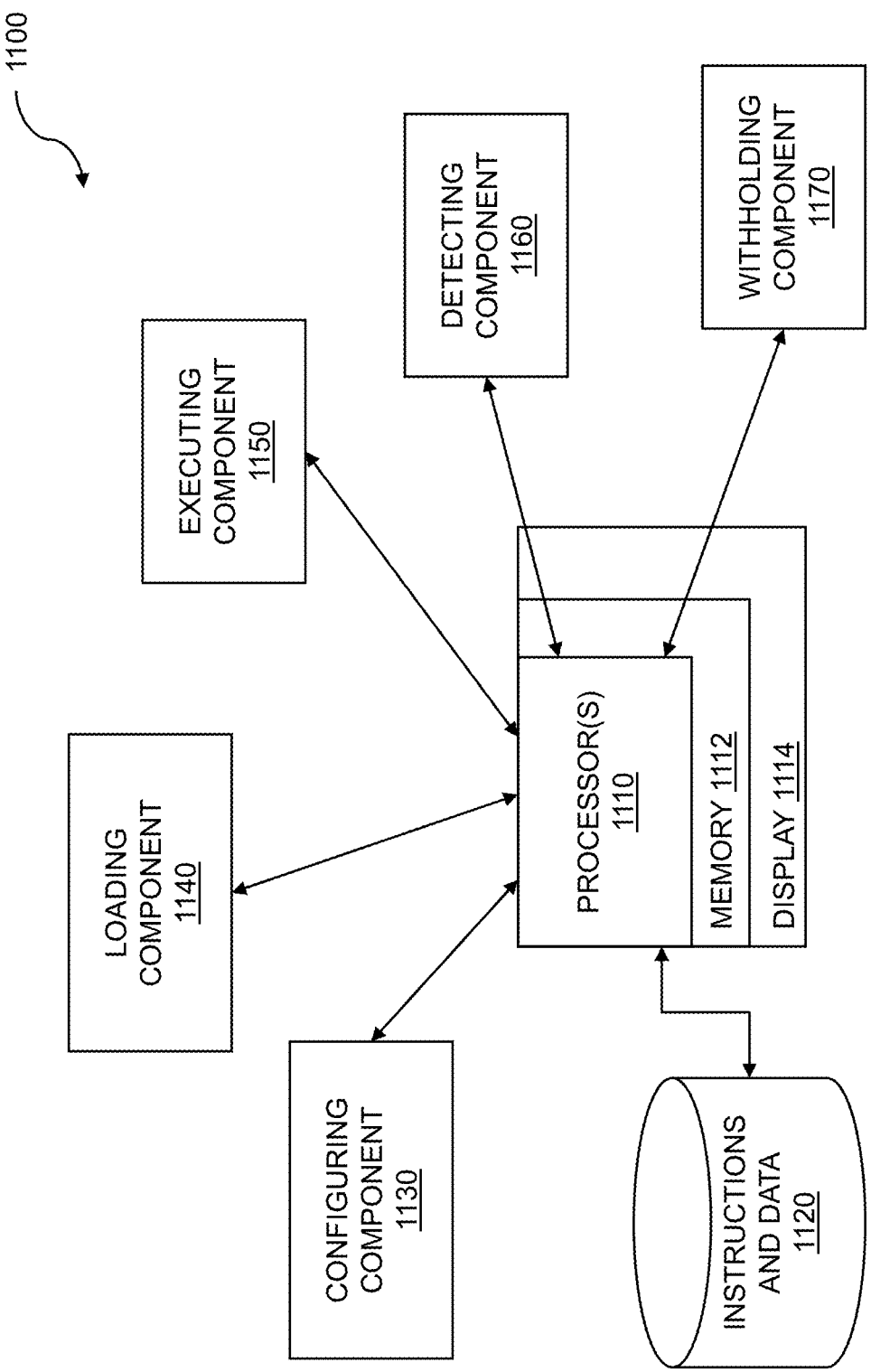
FIG. 11 is a system diagram for data flow graph computation using exceptions.

FIG. 11 is a system diagram for data flow graph computation using exceptions. The system 1100 can include one or more processors 1110 coupled to a memory 1112 which stores instructions. The system 1100 can include a display 1114 coupled to the one or more processors 1110 for displaying data, intermediate steps, instructions, and so on. In embodiments, one or more processors 1110 are coupled to the memory 1112 where the one or more processors, when executing the instructions which are stored, are configured to: configure a plurality of processing elements to implement a data flow graph; load the plurality of processing elements with a plurality of process agents; execute valid data by a first process agent on a first processing element from the plurality of processing elements, wherein the first process agent corresponds to a starting node of the data flow graph; detect, by a second processing element from the plurality of processing elements, that an error exception has occurred, wherein a second process agent is running on the second processing element; and withhold a done signal, by the second process agent, to a third process agent, wherein the third process agent is running on a third processing element from the plurality of processing elements.

The system 1100 can include a collection of instructions and data 1120. The instructions and data 1120 may be stored in a database, one or more statically linked libraries, one or more dynamically linked libraries, precompiled headers, source code, flow graphs, or other suitable formats. The instructions can include instructions for joining data from one or more upstream processing elements in a reconfigurable fabric. The system 1100 can include a configuring component 1130. The configuring component can include functions and instructions for configuring a plurality of processing elements to implement a data flow graph. The configuring can be based on a data flow graph. The system 1100 can include a loading component 1140. The loading component 1140 can include functions and instructions for loading the plurality of processing elements with a plurality of process agents. The process agents can represent nodes of the data flow graph. The process agents can receive one or more data inputs, can process the data, or can generate output data.

The system 1100 can include an executing component 1150. The executing component 1150 can include functions and instructions executing valid data by a first process agent on a first processing element from the plurality of processing elements. The executing the valid data can include determining that valid data is present and available to the process agent. Valid data can be differentiated from invalid data based on a value, a key, a code, a flag, or the like. In embodiments, the first process agent corresponds to a starting node of the data flow graph.

The system 1100 can include a detecting component 1160. The detecting component can include functions and instructions for detecting, by a second processing element from the plurality of processing elements, that an error exception has occurred. In embodiments, a second process agent is running on the second processing element. Various types of error exceptions can be detected. In embodiments, the error exception can include an arithmetic exception. An arithmetic exception can include a divide by zero exception, an underflow exception, an overflow exception, and so on. The detecting the error exception can further include raising, by the second process agent, an interrupt request (IR or IRQ). The IRQ can include a flag, a semaphore, a signal, and the like. The interrupt request can be based on the detecting, by a second processing element from the plurality of processing elements, that an error exception has occurred. Polling of the plurality of processing elements can be performed to identify the error state. In addition to detecting that an error has occurred, one or more agents can be placed into one or more states. Embodiments further include entering, by the second process agent, an error state, wherein the error state is based on the detecting by the second processing element.

The system 1100 can include a withholding component 1170. The withholding component can include functions and instructions for withholding a done signal, by the second process agent, to a third process agent. The process agents can be part of the data flow graph. In embodiments, the third process agent is running on a third processing element from the plurality of processing elements. The second process agent, or other process agent within the data flow graph can withhold a done signal from other process agents. Embodiments further include withholding, by the second process agent, a fire signal from a fourth process agent, where the fourth process agent can be running on a fourth processing element from the plurality of processing elements.

The system 1100 can include a computer program product embodied in a non-transitory computer readable medium for data manipulation, the computer program product comprising code which causes one or more processors to perform operations of: configuring a plurality of processing elements to implement a data flow graph; loading the plurality of processing elements with a plurality of process agents; executing valid data by a first process agent on a first processing element from the plurality of processing elements, wherein the first process agent corresponds to a starting node of the data flow graph; detecting, by a second processing element from the plurality of processing elements, that an error exception has occurred, wherein a second process agent is running on the second processing element; and withholding a done signal, by the second process agent, to a third process agent, wherein the third process agent is running on a third processing element from the plurality of processing elements.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data manipulation comprising:
    configuring a plurality of processing elements to implement a data flow graph;
    loading the plurality of processing elements with a plurality of process agents;
    executing valid data by a first process agent on a first processing element from the plurality of processing elements, wherein the first process agent corresponds to a starting node of the data flow graph;
    detecting, by a second processing element from the plurality of processing elements, that an error exception has occurred, wherein a second process agent is running on the second processing element;
    raising, by the second process agent, an interrupt request, wherein the interrupt request is based on the detecting, by the second processing element from the plurality of processing elements, that the error exception has occurred; and
    in response to the interrupt request, withholding a done signal, by the second process agent, to a third process agent, wherein the third process agent is running on a third processing element from the plurality of processing elements.

2. The method of claim 1 wherein execution ceases based on the interrupt request.

3. The method of claim 1 wherein a state of the second process agent is stored based on the interrupt request.

4. The method of claim 1 wherein the third process agent is upstream within the data flow graph from the second process agent.

5. The method of claim 1 wherein the first process agent and the second process agent are the same agent.

6. The method of claim 1 further comprising withholding, by the second process agent, a fire signal from a fourth process agent, wherein the fourth process agent is running on a fourth processing element from the plurality of processing elements.

7. The method of claim 6 wherein the fourth process agent is downstream within the data flow graph from the second process agent.

8. The method of claim 1 further comprising entering, by the second process agent, an error state, wherein the error state is based on the detecting by the second processing element.

9. The method of claim 8 further comprising polling the plurality of processing elements to identify the error state.

10. The method of claim 9 wherein the polling is accomplished by an execution manager.

11. The method of claim 10 wherein the execution manager is part of a host outside of the plurality of processing elements.

12. The method of claim 11 wherein the host is separately clocked from the plurality of processing elements.

13. The method of claim 1 wherein the error exception includes a code debugging error.

14. The method of claim 1 wherein the error exception includes an arithmetic exception.

15. The method of claim 14 wherein the arithmetic exception includes a divide by zero exception.

16. The method of claim 14 wherein the arithmetic exception includes an underflow exception.

17. The method of claim 14 wherein the arithmetic exception includes an overflow exception.

18. The method of claim 1 wherein the error exception includes a signaling error.

19. The method of claim 18 wherein the signaling error includes a direct memory access abort, a buffer overflow, a buffer underflow, excessive saturation, or an excessive re-computation attempt.

20. The method of claim 1 wherein the processing elements comprise a reconfigurable fabric.

21. A computer program product embodied in a non-transitory computer readable medium for data manipulation, the computer program product comprising code which causes one or more processors to perform operations of:
configuring a plurality of processing elements to implement a data flow graph;
loading the plurality of processing elements with a plurality of process agents;
executing valid data by a first process agent on a first processing element from the plurality of processing elements, wherein the first process agent corresponds to a starting node of the data flow graph;
detecting, by a second processing element from the plurality of processing elements, that an error exception has occurred, wherein a second process agent is running on the second processing element;
raising, by the second process agent, an interrupt request, wherein the interrupt request is based on the detecting, by the second processing element from the plurality of processing elements, that the error exception has occurred; and
in response to the interrupt request, withholding a done signal, by the second process agent, to a third process agent, wherein the third process agent is running on a third processing element from the plurality of processing elements.

22. A computer system for data manipulation comprising:
a memory which stores instructions;
one or more processors coupled to the memory wherein the one or more processors, when executing the instructions which are stored, are configured to:
configure a plurality of processing elements to implement a data flow graph;
load the plurality of processing elements with a plurality of process agents;
execute valid data by a first process agent on a first processing element from the plurality of processing elements, wherein the first process agent corresponds to a starting node of the data flow graph;
detect, by a second processing element from the plurality of processing elements, that an error exception has occurred, wherein a second process agent is running on the second processing element;
raise, by the second process agent, an interrupt request, wherein the interrupt request is based on detection, by the second processing element from the plurality of processing elements, that the error exception has occurred; and
in response to the interrupt request, withhold a done signal, by the second process agent, to a third process agent, wherein the third process agent is running on a third processing element from the plurality of processing elements.

* * * * *